US009987982B2

(12) United States Patent
Sun et al.

(10) Patent No.: US 9,987,982 B2
(45) Date of Patent: Jun. 5, 2018

(54) ENVIRONMENTALLY-FRIENDLY VEHICLE OPERATING SOUND GENERATOR APPARATUS AND METHOD FOR CONTROLLING THE SAME

(71) Applicant: DAESUNG ELECTRIC CO., LTD, Ansan-si, Gyeonggi-do (KR)

(72) Inventors: Jae Seung Sun, Suwon-si (KR); Jong Pil Park, Ansan-si (KR)

(73) Assignee: LS AUTOMOTIVE TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/307,032

(22) PCT Filed: Apr. 28, 2015

(86) PCT No.: PCT/KR2015/004201
§ 371 (c)(1),
(2) Date: Oct. 27, 2016

(87) PCT Pub. No.: WO2015/167192
PCT Pub. Date: Nov. 5, 2015

(65) Prior Publication Data
US 2017/0043713 A1    Feb. 16, 2017

(30) Foreign Application Priority Data

Apr. 29, 2014   (KR) ......................... 10-2014-0051508

(51) Int. Cl.
*B60Q 5/00*    (2006.01)
*B60Q 1/50*    (2006.01)
(Continued)

(52) U.S. Cl.
CPC ............... *B60Q 5/008* (2013.01); *B60Q 5/00* (2013.01); *B60W 20/00* (2013.01); *G10K 15/04* (2013.01);
(Continued)

(58) Field of Classification Search
CPC .......... B60Q 5/00; B60Q 5/008; G10K 15/02; A63F 13/10; H01M 8/04313; H04R 23/00
See application file for complete search history.

(56) References Cited

U.S. PATENT DOCUMENTS

2003/0220722 A1   11/2003   Toba et al.
2005/0113168 A1*  5/2005    Maeda ................... G10K 15/02
                                                                    463/35
(Continued)

FOREIGN PATENT DOCUMENTS

JP      H07-182587 A    7/1995
JP      H07-322403 A    12/1995
(Continued)

*Primary Examiner* — Yuri Kan
(74) *Attorney, Agent, or Firm* — Rabin & Berdo, P.C.

(57) ABSTRACT

A method for controlling an environmentally-friendly vehicle operating sound generator apparatus. The method includes a step of providing an environmentally-friendly vehicle operating sound generator apparatus. The method further includes a diagnosis confirmation step of allowing the control unit to confirm a connection state of the sound output unit and an operation state of the sound source playback unit and compare an output of the sound source amplification unit with a preset reference value to diagnose the presence of distortion. The method further includes an operating sound execution step of allowing the control unit to determine whether or not to generate an operating sound of the environmentally-friendly vehicle according to the vehicle operation state sensed by the vehicle state sensing unit, output at least one sound source, selected from among
(Continued)

the sound sources stored in the sound source storage unit, as the operating sound through the sound output unit.

19 Claims, 12 Drawing Sheets

(51) Int. Cl.

| | | |
|---|---|---|
| *H01M 8/24* | (2016.01) | |
| *B60Q 1/26* | (2006.01) | |
| *H04B 1/00* | (2006.01) | |
| *G01F 17/00* | (2006.01) | |
| *H04R 1/20* | (2006.01) | |
| *G10K 15/04* | (2006.01) | |
| *B60W 20/00* | (2016.01) | |
| *H04R 1/02* | (2006.01) | |

(52) U.S. Cl.
CPC . *B60W 2400/00* (2013.01); *B60W 2510/0638* (2013.01); *B60W 2510/083* (2013.01); *B60W 2510/10* (2013.01); *B60W 2510/244* (2013.01); *B60W 2540/10* (2013.01); *B60W 2540/12* (2013.01); *B60W 2900/00* (2013.01); *H04R 1/026* (2013.01)

(56) References Cited

U.S. PATENT DOCUMENTS

| | | |
|---|---|---|
| 2007/0257783 A1 | 11/2007 | Matsumoto et al. |
| 2007/0269054 A1* | 11/2007 | Takagi ............... A63F 13/10 |
| | | 381/86 |
| 2010/0045450 A1 | 2/2010 | Suzuki et al. |
| 2011/0026729 A1* | 2/2011 | Nakayama ............ B60Q 5/008 |
| | | 381/86 |
| 2012/0077106 A1* | 3/2012 | Kim ................. H01M 8/04313 |
| | | 429/452 |
| 2012/0133503 A1* | 5/2012 | Jeong .................... B60Q 5/008 |
| | | 340/463 |
| 2013/0038435 A1 | 2/2013 | Muroya |
| 2013/0076504 A1* | 3/2013 | Nakayama ............ B60Q 5/008 |
| | | 340/466 |
| 2013/0114827 A1* | 5/2013 | Lee ....................... B60Q 5/008 |
| | | 381/86 |
| 2013/0265150 A1* | 10/2013 | Nakayama ............. H04R 23/00 |
| | | 340/425.5 |
| 2015/0145660 A1 | 5/2015 | Sumi et al. |

FOREIGN PATENT DOCUMENTS

| | | |
|---|---|---|
| JP | 2004-51081 A | 2/2004 |
| JP | 2004-136831 A | 5/2004 |
| JP | 2006-199109 A | 8/2006 |
| JP | 2008-279938 A | 11/2008 |
| JP | 2011-235765 A | 11/2011 |
| JP | 2013-28232 A | 2/2013 |
| KR | 10-2009-0116320 A | 11/2009 |
| KR | 10-0985767 B1 | 10/2010 |
| KR | 10-2011-0060504 A | 6/2011 |
| WO | WO-2012/070334 A1 | 5/2012 |
| WO | WO-2013/118250 A1 | 8/2013 |
| WO | WO-2014-006893 A1 | 1/2014 |

* cited by examiner

ENVIRONMENTALLY-FRIENDLY VEHICLE OPERATING SOUND GENERATOR APPARATUS AND METHOD FOR CONTROLLING THE SAME

TECHNICAL FIELD

The present invention relates to an environmentally-friendly vehicle operating sound generator apparatus and a control method thereof. More specifically, the present invention relates to an environmentally-friendly vehicle operating sound generator apparatus and a control method thereof, which senses various operation states of a vehicle and plays back various kinds of operating sounds according to the sensed vehicle operation states or in different playback methods so that a virtual sound, i.e., an operating sound, which is close to a real engine sound according to the vehicle operation states, can be generated and output to be delivered to a driver or a pedestrian, thereby further securing safety of the pedestrian, and inducing a safe drive of the driver.

BACKGROUND ART

In recent years, due to depletion of energy, the development of an environmentally-friendly vehicle as an alternative transportation means is in increasingly active progress. Examples of representative environmentally-friendly vehicles include hybrid vehicles, electric vehicles, hydrogen fuel cell electric vehicles and the like. Since such an environmentally-friendly vehicle does not adopt a method of operating an engine, it does not generate an engine noise or the like while driving unlike an existing internal combustion engine vehicle. Accordingly, the establishment of regulations on the environmentally-friendly vehicles is being prepared to protect pedestrians around a vehicle, and the research and development of a virtually operating sound generation system of an environmentally-friendly vehicle are required in relation to the establishment of regulations.

That is, an environmentally-friendly vehicle such as a hybrid vehicle, an electric vehicle, a hydrogen fuel cell electric vehicle or the like does not generate an engine's unique sound generated from a gasoline vehicle or a diesel vehicle. For this reason, there occur problems in that an accident may occur since a pedestrian does not recognize a vehicle approaching the pedestrian or a vehicle at a place such as an alley or an indoor parking lot, and in that it is also difficult for a driver to recognize the startup state or the current state of a vehicle since a vehicle noise is not generated.

Furthermore, a vehicle including an energy recharge system, such as an electric vehicle, a hydrogen fuel cell electric vehicle or the like, entails problems in that it is difficult to know whether the recharge is started or finished upon the recharge by the connection of a charger, and in that it is very inconvenient to use the vehicle due to extreme insufficiency of vehicle information that can be recognized by a driver in relation to a risk caused by discharge of a battery or deficiency of fuel.

In an attempt to solve such problems, apparatuses for generating a virtual engine sound for environmentally-friendly vehicles are recently developed. However, virtual engine sound generation apparatuses that are being currently developed simply generate a sound similar to an engine sound associated with the driving of a vehicle and cannot provide various functions to a pedestrian or a driver, and its technical level is still insignificant since information on the current state of the vehicle is provided insufficiently.

In Particular, although the engine of a vehicle starts, the startup state of the engine cannot be identified since an engine startup sound unique to the vehicle is not generated. In addition, since only a message informing that the vehicle can travel is simply displayed on the cluster of the vehicle, it is insufficient for the transmission of the current vehicle state to the driver. Further, although an environmentally-friendly vehicle includes an apparatus for generating a virtual engine sound, currently, the apparatus merely generates a sound similar to a sound of a vehicle according to the speed of the vehicle and informs a pedestrian of approach of the vehicle by increasing or decreasing the volume when the vehicle travels in a specific speed section. However, such a conventional apparatus encounters a problem in that the driver and the pedestrian may feel uncomfortable since the actual behavior of the driver accelerating or decelerating the vehicle somewhat does not match with the generated virtual engine sound of the vehicle. In addition, there is also a problem in that since the driver who is a subject of driving the vehicle is not informed of the current state of the vehicle, he or she cannot properly grasp the current state of the vehicle.

Besides, such a conventional technology controls only the volume of a sound, and, furthermore, it is difficult to confirm whether or not a normal sound source is output through a general self-diagnosis on the volume control.

As an example of the prior art, there has been disclosed Korean Patent Registration No. 10-985767.

DISCLOSURE OF INVENTION

Technical Problem

Accordingly, the present invention has been made to solve the above-mentioned problems occurring in the prior art, and it is an object of the present invention to provide an environmentally-friendly vehicle operating sound generator apparatus which senses various operation states of a vehicle and plays back various kinds of operating sounds according to the sensed vehicle operation states or in different playback methods so that a virtual operating sound which is close to a real engine sound or a real operating sound according to the vehicle operation states, can be delivered to a driver or a pedestrian, thereby further securing safety of the pedestrian, and inducing a safe drive of the driver.

Another object of the present invention is to provide an environmentally-friendly vehicle operating sound generator apparatus which generates, in the form of a guidance message, an operating sound capable of informing a user of various states of a charger connection state, a charging power energy level, and the like of a vehicle so that a driver can easily recognize a state of the vehicle, and thus he or she can perform the driving manipulation and management of the vehicle more conveniently.

Still another object of the present invention is to provide an environmentally-friendly vehicle operating sound generator apparatus which enables to diagnose whether to output a normal sound source is output, thereby preventing the possibility of occurrence of safety accidents due to no generation of a vehicle operating sound during the driving of the vehicle.

Technical Solution

To achieve the above objects, in one aspect, the present invention provides a method for controlling an environmentally-friendly vehicle operating sound generator apparatus, the method including: a providing step of providing the environmentally-friendly vehicle operating sound generator apparatus comprising a vehicle state sensing unit for sensing an operation state of a vehicle, a sound source storage unit for storing a plurality of operating sounds that can be output according to the operation state of the vehicle in the form of a sound source data, a sound source playback unit for selecting at least one of the operating sounds stored in the sound source storage unit and playing back the selected sound source output from the sound source storage unit, a sound source amplification unit for amplifying the operating sound played back by the sound source playback unit, a sound output unit for outputting the operating sound amplified by the sound source amplification unit, and a control unit for receiving a sensing signal from the vehicle state sensing unit and controlling the operation of the sound source playback unit so as to play back the operating sound in different playback methods in such a manner as to control and change the operating sound according to the received sensing signal; an initialization step of comprising a diagnosis confirmation step (S30) of allowing the control unit to confirm a connection state of the sound output unit and an operation state of the sound source playback unit and compare an output of the sound source amplification unit with a preset reference value to diagnose the presence of distortion; and an operating sound execution step of allowing the control unit to determine whether or not to generate an operating sound of the environmentally-friendly vehicle according to the vehicle operation state sensed by the vehicle state sensing unit, and output at least one sound source, selected from among the sound sources stored in the sound source storage unit, as the operating sound through the sound output unit.

In the control method of an environmentally-friendly vehicle operating sound generator apparatus, the operating sound execution step may include: a sound source playback unit operation step of operating the sound source playback unit to be turned on; an engine start sound operating step of determining whether or not to start the vehicle from an engine state sensing signal of the vehicle state sensing unit, and outputting an engine start sound of the operating sounds through the sound output unit; a driving sound operating step of determining whether or not the vehicle drives from a vehicle driving speed signal of the vehicle state sensing unit, and outputting a driving sound of the operating sounds through the sound output unit; and a continuation confirmation step of confirming the current operation state of the vehicle by updating the vehicle driving speed signal and the engine state sensing signal of the vehicle state sensing unit, and determining whether or not to continue the output of the engine start sound or the driving sound.

In the control method of an environmentally-friendly vehicle operating sound generator apparatus, the engine start sound operating step may include: an engine start determination step of determining whether or not to start the engine of the vehicle from the engine state sensing signal; and an engine start sound output step of, if it is determined in the engine start determination step that the engine of the vehicle is in a started state, outputting the engine start sound of the operating sounds through the sound output unit.

In the control method of an environmentally-friendly vehicle operating sound generator apparatus, the driving sound operating step may include: driving state determination step of determining whether or not the vehicle drives from the vehicle driving speed signal of the vehicle state sensing unit; a driving sound output step of, if it is determined in the driving state determination step that the current driving speed of the vehicle is equal to or smaller than a preset speed, outputting the driving sound of the operating sounds through the sound output unit.

In the control method of an environmentally-friendly vehicle operating sound generator apparatus, the driving sound output step may include: an acceleration driving state determination step of determining whether or not the vehicle is in an acceleration driving state by comparing a vehicle driving acceleration signal of the vehicle state sensing unit with a preset acceleration reference value; and a driving sound output execution step of generating and outputting, as a corresponding driving sound, one of a light acceleration driving sound, a rapid acceleration driving sound, and a sudden brake driving sound of the operating sounds based on a result of the determination made in the acceleration driving state determination step.

In the control method of an environmentally-friendly vehicle operating sound generator apparatus, the acceleration driving state determination step may include: a light acceleration driving determination step of, if it is determined that the vehicle driving acceleration signal is within the range between 0 and the preset acceleration reference value, determining that the driving state of the vehicle is a light acceleration state; and a rapid acceleration driving determination step of, if it is determined that the vehicle driving acceleration signal is not within the range between 0 and the preset acceleration reference value, determining whether or not the vehicle driving acceleration signal is larger than the preset acceleration reference value.

In the control method of an environmentally-friendly vehicle operating sound generator apparatus, if it is determined in the rapid acceleration driving determination step that the vehicle driving acceleration signal is not larger than the preset acceleration reference value, the driving sound output execution step sets the corresponding driving sound as a sudden brake driving sound.

In the control method of an environmentally-friendly vehicle operating sound generator apparatus, the continuation confirmation step may include: a high speed stop confirmation step of confirming the current operation state of the vehicle by updating the vehicle driving speed signal and the engine state sensing signal of the vehicle state sensing unit, and determining and executing whether or not to stop the driving sound by determining whether or not the vehicle drives at a high speed; and an output state confirmation step of confirming the current operation state of the vehicle by updating the vehicle driving speed signal and the engine state sensing signal, and determining whether or not to continue the engine start sound or the driving sound by determining whether or not the vehicle engine is turned off.

In the control method of an environmentally-friendly vehicle operating sound generator apparatus, the diagnosis confirmation step may include: a sound output unit connection confirmation determination step of confirming whether or not the sound output unit 800 establishes a normal electrical connection state; a sound source playback unit operation step of, if it is determined that the sound output unit establishes the normal electrical connection state, applying electric power to the sound source playback unit to allow the sound source playback unit to be operated to be turned on; a diagnosis sound source generation step of allowing the sound source playback unit to play back a diagnosis sound source stored in the sound source storage unit; a distortion confirmation step of comparing a diagnosis sound source amplification signal indicating that the diagnosis sound source generated in the diagnosis sound source generation step is amplified in and outputted from the sound source amplification unit with a preset distortion determination reference value for confirming whether or not the sound source is distorted and amplified to determine whether or not the diagnosis sound source amplification signal is distorted, and outputting a warning signal if it is determined that the diagnosis sound source amplification signal exceeds the preset distortion determination reference value and thus the diagnosis sound source is distorted.

In the control method of an environmentally-friendly vehicle operating sound generator apparatus, the sound output unit connection confirmation determination step may include: a sound output unit connection confirmation step of allowing the control unit to transmit a connection confirmation transmission signal to the sound source amplification unit to allow the sound source amplification unit to confirm whether or not the sound output unit is normally electrically connected to the sound source amplification unit, and receive a connection confirmation response signal indicating whether or not the sound source amplification unit establishes a normal electrical connection state with the sound output unit from the sound source amplification unit; and a sound output unit connection determination step of determining whether the connection confirmation response signal is not present or a non-connection confirmation response signal is present in the sound output unit connection confirmation step.

In the control method of an environmentally-friendly vehicle operating sound generator apparatus, the sound output unit connection confirmation determination step further comprises a connection warning step of outputting a warning signal so that the driver can confirm a connection abnormal state of the sound output unit if it is determined in the sound output unit connection confirmation determination step that the sound source amplification unit is not electrically connected to the sound output unit.

In the control method of an environmentally-friendly vehicle operating sound generator apparatus, the connection warning step may include at least one of a sound warning through a separate sound output unit connected to the control unit, a video warning through a separate display output unit connected to the control unit, and an engine blocking warning of blocking the start of the engine of the vehicle.

In the control method of an environmentally-friendly vehicle operating sound generator apparatus, the distortion confirmation step may include: a sound source amplification unit output confirmation step of confirming the diagnosis sound source amplification signal outputted from the sound source amplification unit; an output reference determination step of comparing the diagnosis sound source amplification signal with the preset distortion determination reference value as a preset data stored in the storage unit and determining a result of the comparison; and a distortion warning step of, if it is determine in the output reference determination step that the diagnosis sound source amplification signal is beyond the preset distortion determination reference value, allowing the control unit to determine that a distortion occurs in the diagnosis sound source being outputted in the process of generating, amplifying and outputting the diagnosis sound source and warn a driver of the distortion.

In the control method of an environmentally-friendly vehicle operating sound generator apparatus, the diagnosis sound source amplification signal may be compared with the preset distortion determination reference value in the output reference determination step, and in the diagnosis sound source amplification signal, a signal that is present within a range of the preset distortion determination reference value may be converted into a signal having a predetermined output voltage value and outputted, and a signal that is beyond the range of the preset distortion determination reference value may be converted into a signal having a value of 0 and outputted.

In the control method of an environmentally-friendly vehicle operating sound generator apparatus, the initialization step may further include a charging confirmation step of confirming the necessity for the charging of the vehicle, and the vehicle state sensing unit may further include a charging cable connection sensing unit. The charging confirmation step may include: a charging cable connection sensing step of allowing the charging cable connection sensing unit to sense whether or not a charging cable is connected to a charging unit of the vehicle; a battery level confirmation step of confirming a battery level from a battery sensor of the vehicle state sensing unit; a charging sound source playback unit operation step of apply electric power to the sound source playback unit to operate the sound source playback unit to be turned on; a charging necessity determination step of, if the battery level confirmed in the battery level confirmation step is equal to or smaller than a preset battery level as a reference value for determination of whether or not to charge the battery, determining that the charging of the vehicle is currently needed; a charging cable connection determination step of determining whether or not the charging cable is connected to the vehicle based on a result of the confirmation of whether or not the charging cable is connected to the charging unit in the charging cable connection sensing step; a charging initiation step of, if it is determined in charging cable connection determination step that the charging cable is connected to the vehicle, initiating the charging and outputting a charging initiation sound selected from among sound sources stored in the sound source storage unit through the sound source playback unit, the sound source amplification unit, and the sound output unit; and a charging completion step of determining whether or not the charging of the battery is completed by updating a sensing signal of the battery sensor, and outputting a charging completion sound selected from among sound sources stored in the sound source storage unit through the sound source playback unit, the sound source amplification unit, and the sound output unit.

In another aspect, the present invention provides an environmentally-friendly vehicle sound generator apparatus including: a vehicle state sensing unit for sensing an operation state of a vehicle; a sound source storage unit for storing a plurality of operating sounds that can be output according to the operation state of the vehicle in the form of a sound source data; a sound source playback unit for selecting at least one of the operating sounds stored in the sound source storage unit and playing back the selected sound source output from the sound source storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal. The control unit confirms a connection state of the sound output unit and an operation state of the sound source playback unit, and diagnoses the presence of a distortion by comparing an output of the sound source amplification unit with a preset reference value.

In the environmentally-friendly vehicle operating sound generator apparatus, the vehicle state sensing unit may sense at least one of a power energy charged state, an operation ready state, a gear operation state, an operating speed of an electric motor, an operating torque of an electric motor, an acceleration pedal position, a brake pedal position, a charging cable connection state, and an engine rotation speed of the vehicle.

In the environmentally-friendly vehicle operating sound generator apparatus, the sound source storage unit may have stored therein, in the form of a sound source data, an engine start sound of the vehicle, a driving sound of the vehicle engine during the driving of the vehicle, an acoustic sound including a diagnosis warning sound generated to warn abnormality during the outputting of a distortion of a sound output of the vehicle and a separate warning sound, and a voice sound formed in the form of a voice guidance message.

In the environmentally-friendly vehicle operating sound generator apparatus, the vehicle state sensing unit may further include a charging cable connection sensing unit for sensing the connection of a charging cable to the vehicle to confirm whether or not a charger of the vehicle is connected to a power supply, and the sound source playback unit may be controlled in operation by the control unit to playback a charger connection sound of the charging sounds stored in the sound source storage unit depending on whether or not the charger is connected to the power supply.

Advantageous Effects

The environmentally-friendly vehicle operating sound generator apparatus according to the embodiments of the present invention as constructed above have the following advantageous effects.

Various operation states of a vehicle are sensed and various kinds of operating sounds are played back according to the sensed vehicle operation states or through variable pitch or mixing in different playback methods so that a further realistic operating sound can be delivered to a driver or a pedestrian according to a vehicle operation state, thereby further securing safety of the pedestrian, and inducing a safe drive of the driver.

An operating sound capable of informing a user of various states of a charger connection state, a charging power energy level, and the like of a vehicle is generated in the form of a guidance message so that a driver can easily recognize a state of the vehicle, and thus he or she can perform the driving manipulation and management of the vehicle more conveniently.

In addition, a diagnosis function is performed in an initial state of the vehicle to determine whether a driving sound or an engine sound is outputted normally and thus a distortion is present in a sound output, thereby preventing the possibility of occurrence of safety accidents due to no generation of a vehicle operating sound during the driving of the vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
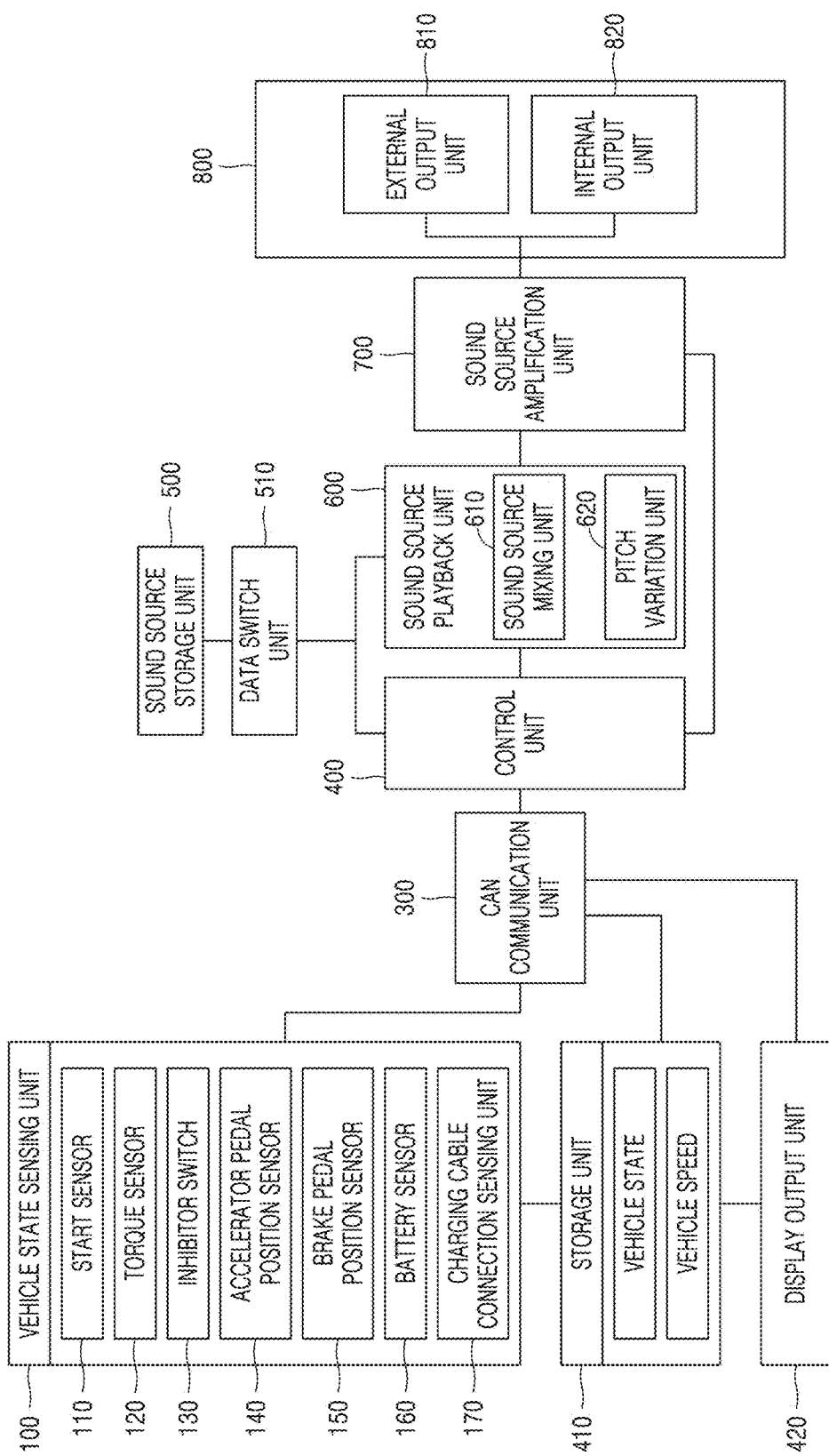
FIG. 1 is a block diagram functionally illustrating the configuration of an environmentally-friendly vehicle operating sound generator apparatus according to an embodiment of the present invention.

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

Figure 2:
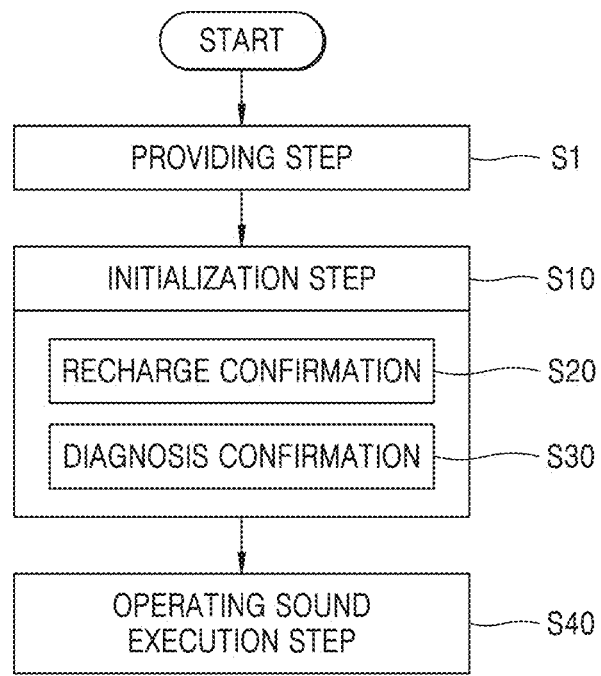
FIGS. 2 to 6 are flowcharts illustrating a stepwise control method of an environmentally-friendly vehicle operating sound generator apparatus according to an embodiment of the present invention.
Figure 7:
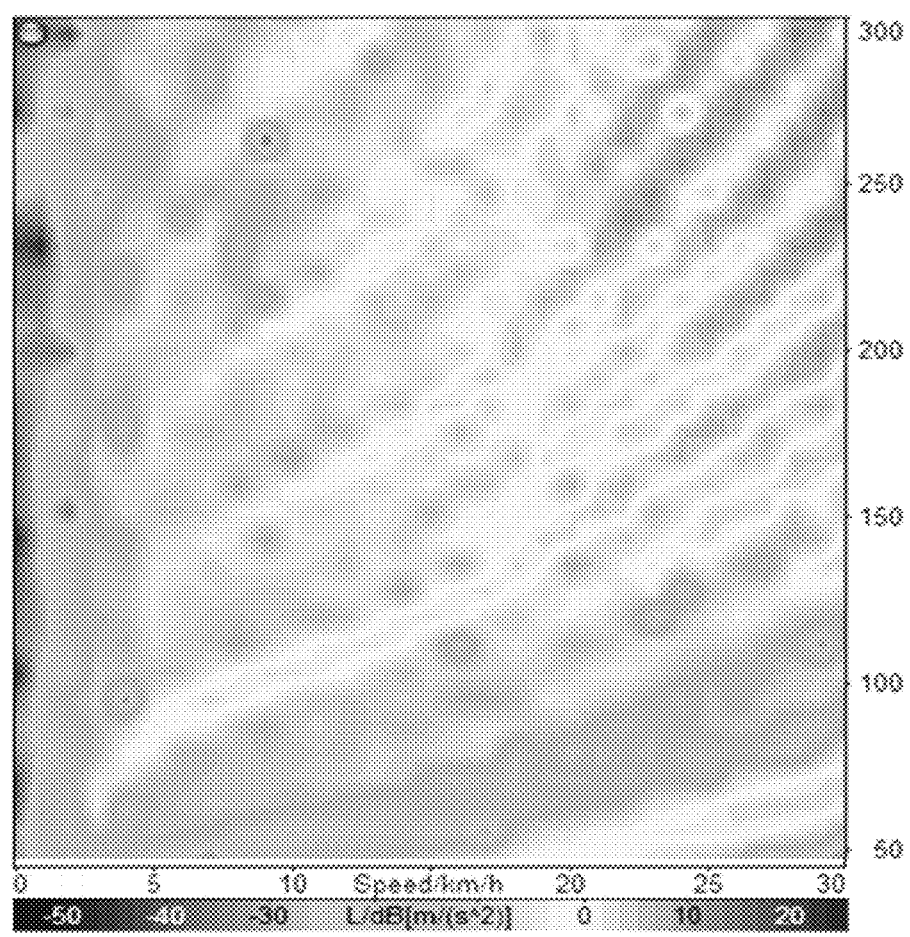
FIG. 7 is a diagram illustrating the relationship of the frequency and the sound pressure of a real engine sound to the speed.
Figure 8:
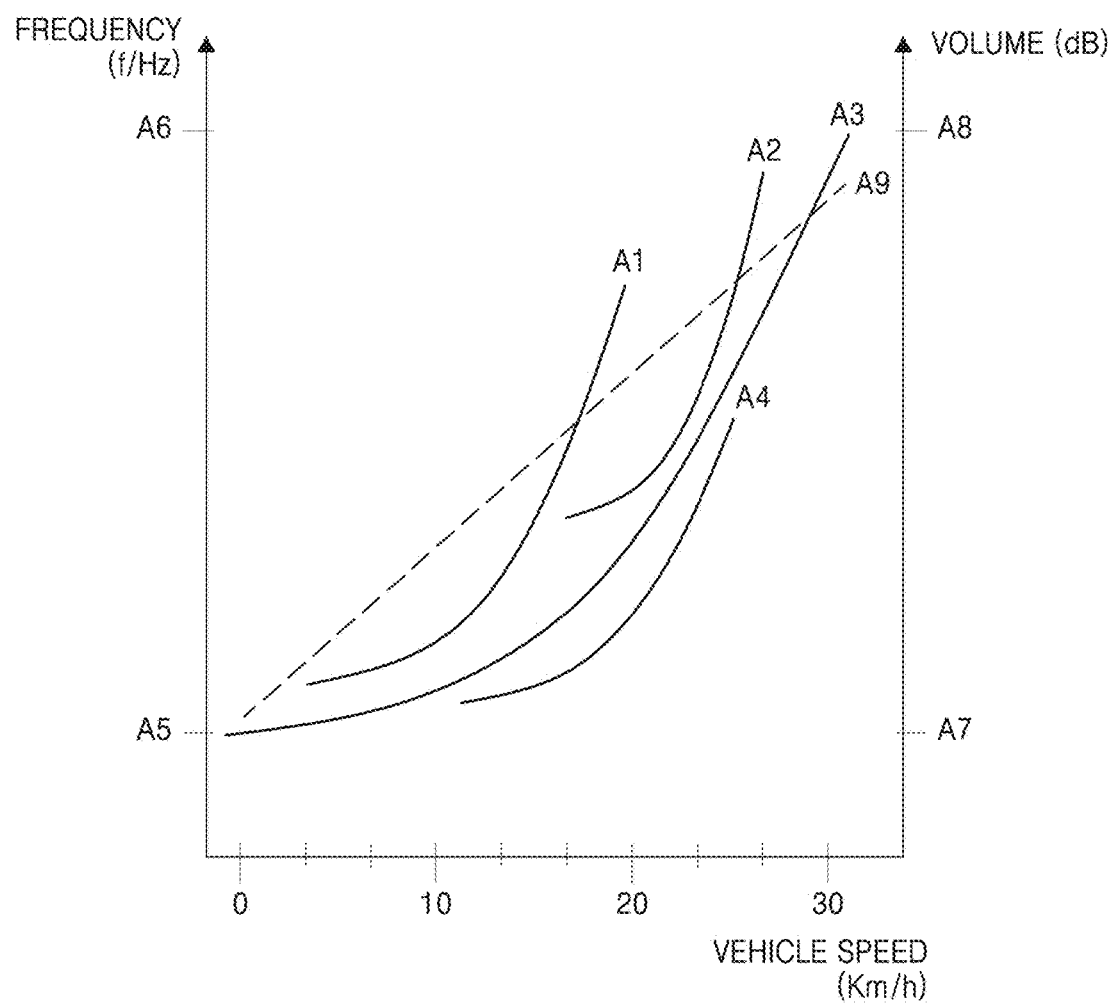
FIG. 8 is a diagram illustrating the relationship of the frequency to the vehicle speed, which illustratively represents an output of a driving sound of an environmentally-friendly vehicle operating sound generator apparatus according to an embodiment of the present invention.
Figure 9:
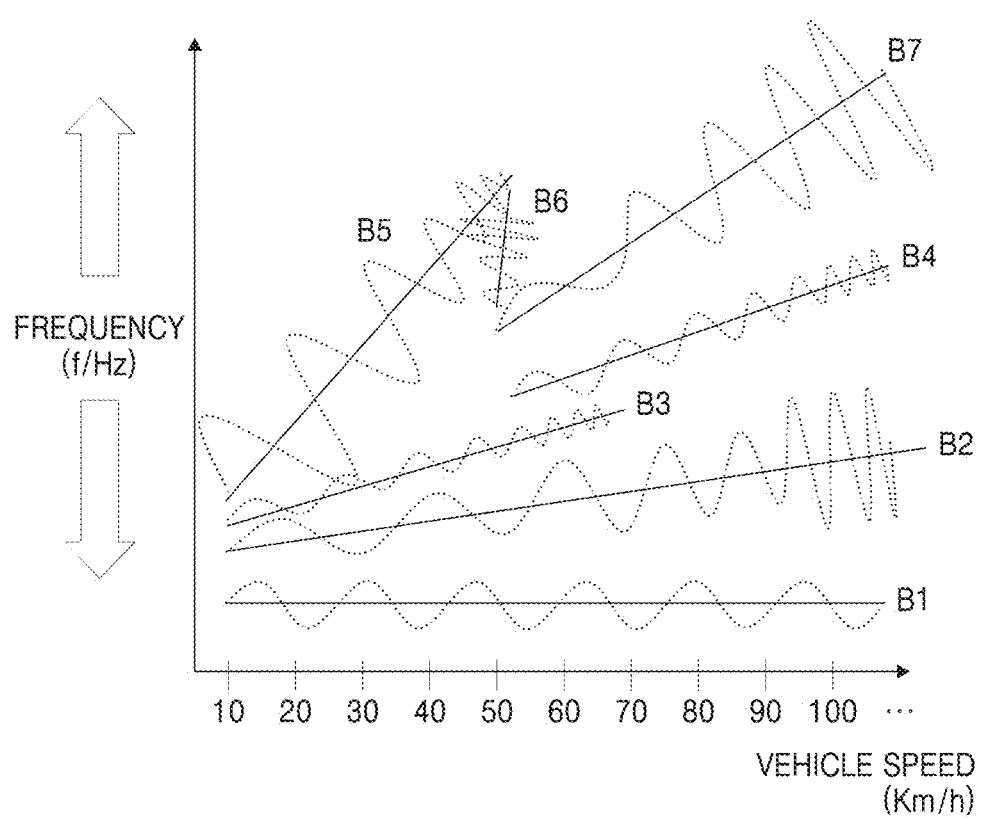
FIG. 9 is a diagram illustrating the relationship of the frequency of a sound source to the vehicle speed for various driving environments of an environmentally-friendly vehicle operating sound generator apparatus according to an embodiment of the present invention.
Figure 10:
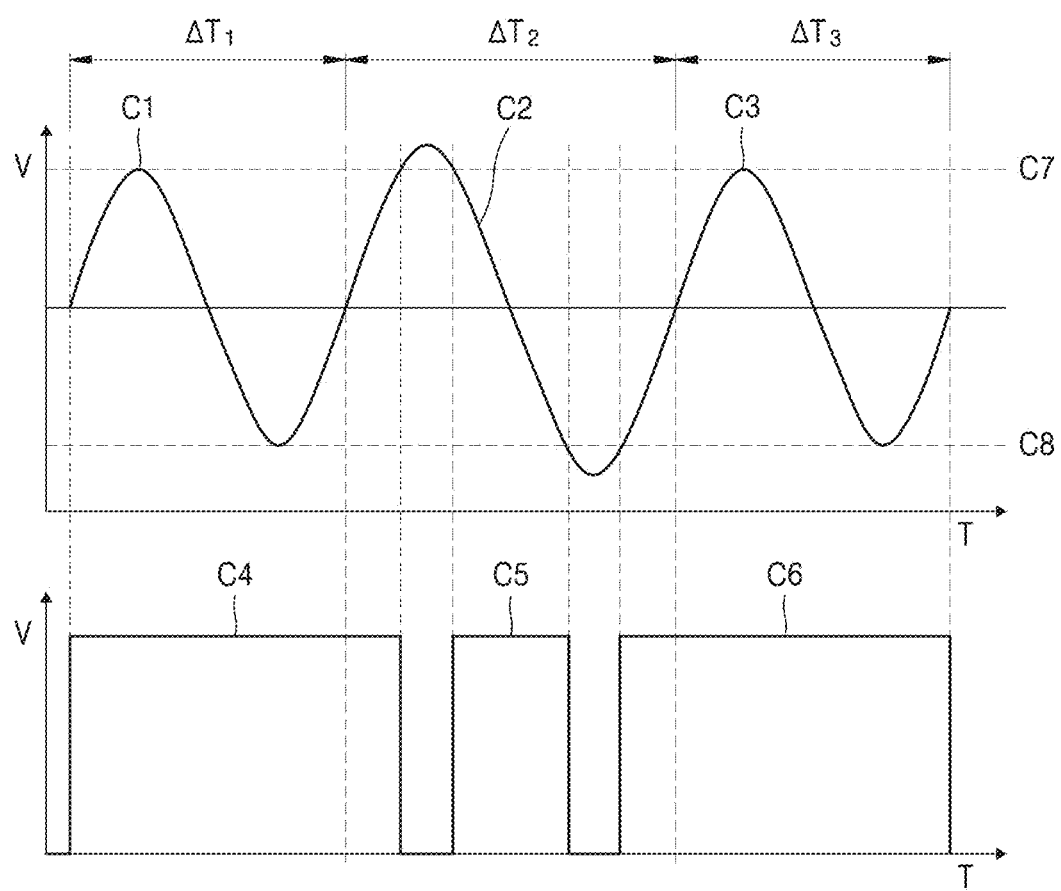
FIG. 10 is a diagram illustrating the comparison between a diagnosis sound source amplification signal for confirmation of whether or not a distortion is present and a reference value in a diagnosis confirmation step of a control process of an environmentally-friendly vehicle operating sound generator apparatus according to an embodiment of the present invention.
Figure 11:
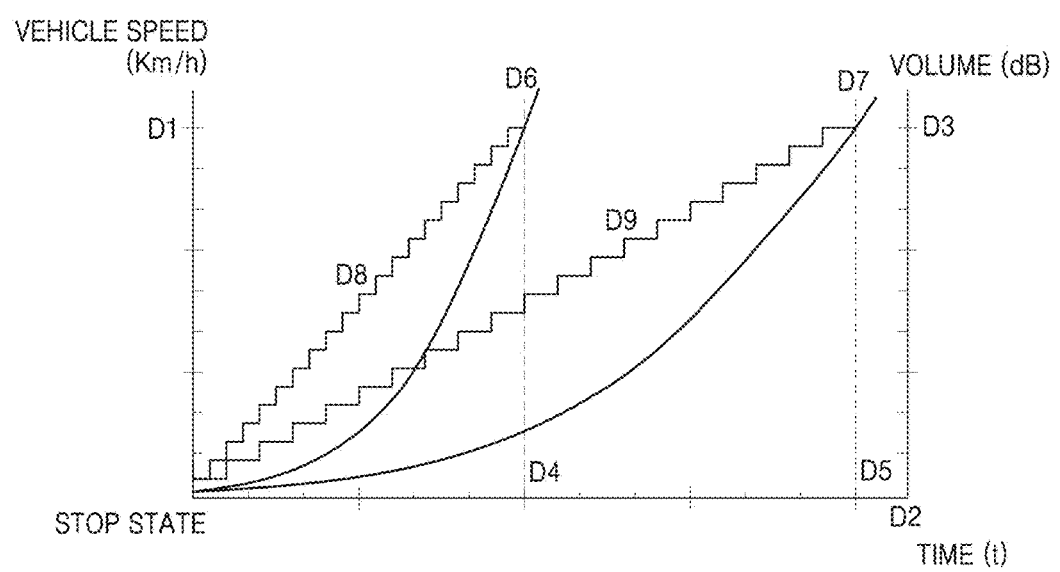
FIG. 11 is a diagram illustrating the relationship of the vehicle speed and the sound pressure (or volume) to the time for representation of a pitch change state according to a change in the acceleration condition with respect to the same driving speed range.

FIG. 1 is a block diagram functionally illustrating the configuration of an environmentally-friendly vehicle operating sound generator apparatus according to an embodiment of the present invention. FIG. 2 is a flowchart illustrating the operation state of a control method of an environmentally-friendly vehicle operating sound generator apparatus according to an embodiment of the present invention, FIGS. 3 to 6 are flowcharts illustrating the detailed steps of the control method of an environmentally-friendly vehicle operating sound generator apparatus according to an embodiment of the present invention, FIGS. 7 and 8 are diagram illustrating the relationship of the frequency and the sound pressure of a conventional engine sound to the vehicle speed, FIG. 9 is a diagram illustrating the relationship of the frequency of an individual sound source to the vehicle speed and the change in the sound pressure (or volume) for various driving environments, FIG. 10 is an exemplary diagram illustrating a determination of whether or not a distortion is present in a sound source generated and outputted from the sound source playback unit, and FIG. 11 is a diagram illustrating the relationship between the vehicle speed and the change in the pitch.

An environmentally-friendly vehicle sound generator apparatus according to this embodiment is an apparatus for generating and providing a further realistic and safe virtual operating sound to a driver or a pedestrian by applying various operating sounds or playback methods according to an operation state of a vehicle. The environmentally-friendly vehicle sound generator apparatus includes a vehicle state sensing unit 100, a sound source storage unit 500, a sound source playback unit 600, a sound output unit 800 and a control unit 400.

The vehicle state sensing unit 100 is configured to sense an operation state of a vehicle. Since various operating sounds can be generated according to the operation state of a vehicle sensed through the vehicle state sensing unit, the vehicle state sensing unit is preferably configured to sense various operation states of the vehicle. For example, the vehicle state sensing unit 100 may include a start button 110 of the vehicle, a torque sensor 120 for sensing an output torque of an electric motor which is a power generation means of the vehicle, an inhibitor switch 130 for sensing and outputting a gear shift range of a vehicle transmission when the vehicle transmission is provided, an acceleration pedal position sensor 140 for sensing and outputting a position of the acceleration pedal to confirm whether or not the driver accelerates the vehicle, a brake pedal position sensor 150 for sensing and outputting a position of the brake pedal to confirm the position of the brake pedal of the driver, a battery sensor 160 for sensing a charged state of power energy of the vehicle, and a charging cable connection confirming unit 170 for confirming connection to a charging connector when the charging connector (not shown) is separately provided in the vehicle. In some cases, if the vehicle is a hybrid vehicle, i.e., the vehicle includes a vehicle engine as an internal combustion engine, a crank position sensor (CPS) for sensing an operation state of the engine, i.e., whether or not the engine is started, and sensing an engine rotation speed of the engine may be further provided. Other than these elements, the vehicle state sensing unit 100 may be configured to sense various kinds of vehicle operation states, such as an operation ready state of the vehicle, an operating speed of an electric motor, a driving speed of the vehicle and the like. It may be configured to sense each of the operation states through a separate sensor or the like, and the speed, acceleration and the like of the vehicle can be determined through the operation states sensed here, and an operating sound of a form further appropriate to the current operation state can be generated using the sensed operation states.

The sound source storage unit 500 is configured to store various kinds of operating sounds, which can be output according to an operation state of the vehicle, in the form of a sound source data. For example, an operating sound such as an engine start sound of a vehicle, i.e., the engine start sound generated when an engine starts, and a driving sound generated when the vehicle drives, particularly, a light acceleration driving sound of an engine generated when the vehicle drives at a low speed of 20 to 30 km/h, a rapid acceleration driving sound generated when the engine abruptly accelerates, and a sudden brake driving sound generated when the vehicle abruptly stops by abrupt operation of the brake, an acoustic sound such as a charging initiation sound expressing a recharge start state of the vehicle, a charging completion sound expressing a charging completion state and a separate warning sound such as a charging warning sound expressing a request of charging cable connection caused by disconnection of the charging cable when recharge is needed, a voice sound formed in a voice guidance message, and the like can be stored in the form of a sound source data.

The sound source playback unit 600 is controlled in operation by the control unit 400, and is configured to select any one of the operating sounds stored in the sound source storage unit 500 and play back the selected operating sound in various playback methods. For example, a sound source can be played back in a method of increasing or decreasing the volume of an operating sound, or the sound source can be played back in a fade-in method of gradually increasing the volume or a fade-out method of gradually decreasing the volume to naturally express a sound source.

In addition, the sound source may be played back by adjusting the frequency of an output sound source according to the position of the acceleration pedal, the operating speed of the electric motor, the operating torque of the electric motor or the like, which are sensed by the vehicle state sensing unit 100.

In this embodiment, the sound source playback unit 600 is provided with a sound source mixing unit 610 and a pitch variation unit 620, and the sound source mixing unit 610 of the sound source playback unit can output an operating sound by mixing a plurality of sound source data, and the pitch variation unit 620 may make it possible to recognize a change of sound through a change of pitch of one octave or more in the audio frequency domain by varying the pitch of a corresponding operating sound. In this embodiment, the sound source playback unit 600 outputs an operating sound by simply changing the volume, or outputs an operating sound improving recognizability through change of frequency of one octave or more by simultaneously changing the pitch and the volume, or the sound source playback unit 600 forms a basic low frequency sound source of a 100 Hz to 300 Hz range, which does not have change of pitch and volume, as a basic operating sound using the sound source mixing unit 610, selects a sound source increasing the volume as an additional operating sound, in addition to a sound source having a frequency component larger than the frequency domain initially generated by the change of frequency according to the vehicle speed, and mixes and outputs the sound sources, or the sound source playback unit 600 divides the frequency domain based on a predetermined vehicle speed and selects a sound source having a range of frequency change different from that of the pitch and the volume as an operating sound according to the vehicle speed and naturally connects two overlapped sound sources in a method of fading in and fading out a sound source in a section overlapping a plurality of sound sources. In addition, a basic low frequency sound source is formed as a basic operating sound in a method of outputting a sound source of rapid acceleration or sudden braking. In the case of a rapid acceleration driving sound, a sound source (see B5 in FIG. 9) expressing a strongly accelerating state is mixed by extending the range of frequency change, and in the case of a sudden braking driving sound, a decelerated state of the vehicle can be expressed by using a sound source (see B6 in FIG. 9) which also decreases the volume while moving from a high frequency domain to a low frequency domain as the vehicle speed decreases. In addition, in the case of a rapid acceleration in which the vehicle speed exceeds a predetermined level, a basic low frequency sound source is formed as a basic operating sound, and a sound source increasing the volume while moving from a low frequency domain to a high frequency domain in a wide range of frequency change is used as a rapid acceleration driving sound, so that a pedestrian or a driver may recognize the rapid acceleration state at a predetermined speed or higher through the increase in the pitch and the volume of the operating sound.

The sound output unit 800 is a device for outputting an operating sound played back by the sound source playback unit 600, and as shown in FIG. 1, it may be configured of an external output unit 810 for outputting an operating sound to the outside of a vehicle to be delivered to a pedestrian and an internal output unit 820 for outputting an operating sound to the inside of the vehicle to be delivered to the driver. Any one or both of the external output unit 810 and the internal output unit 820 can be selected according to an operating sound being played back and controlled by the control unit 400 to output the operating sound. The external output unit 810 may be mounted to be arranged inside the bonnet of the vehicle to deliver an operating sound related to the current vehicle operation state to a pedestrian positioned in front of or beside the vehicle or the driver, and the internal output unit 820 may be separately mounted inside the vehicle to deliver an operating sound into the interior space of the vehicle to deliver an operating sound related to the current vehicle operation state to the driver.

The control unit 400 receives various sensing signals sensed by the vehicle state sensing unit 100, controls the operation of the sound source playback unit 600 to play back different kinds of operating sounds in different playback methods according to the received sensing signal, and generally controls the operation state of the entire system. At this point, the control unit 400 is configured to receive the sensing signal from the vehicle state sensing unit 100 through a CAN communication unit 300.

The data switch unit 510 shown in FIG. 1 functions as an intermediate switch to prevent data collision in the process of writing, reading or deleting a sound source data from the sound source storage unit 500 by the control unit 400 and the sound source playback unit 600. The sound source amplification unit 700 is configured to receive a sound source output from the sound source playback unit 600, generate an energy component larger than the energy component of the sound source output from the sound source playback unit 600 to deliver the sound source to the driver or a pedestrian through the sound output unit 800, and output the sound of a large energy component to the outside.

According to such a configuration, since the environmentally-friendly vehicle sound generator apparatus according to an embodiment of the present invention senses various operation states of a vehicle and outputs an operating sound of a form appropriate to a corresponding operation state according thereto in various manners so that the pedestrian can recognize a vehicle state, thereby further securing safety of a pedestrian, and the driver can further correctly recognize the current operation state of the vehicle, thereby maintaining a driving condition of the driver in a more convenient and safe manner.

Figure 3:
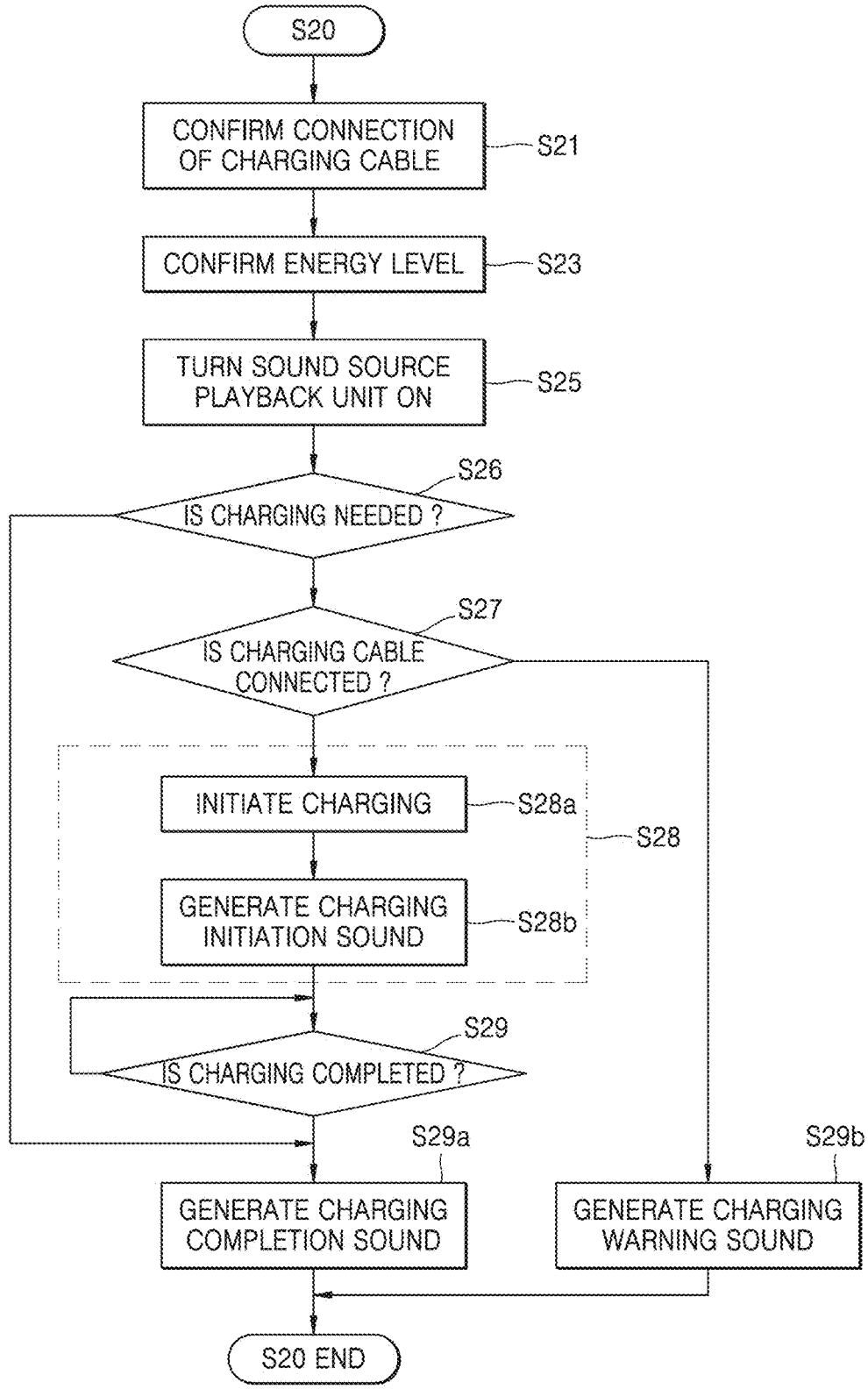
Figure 4:
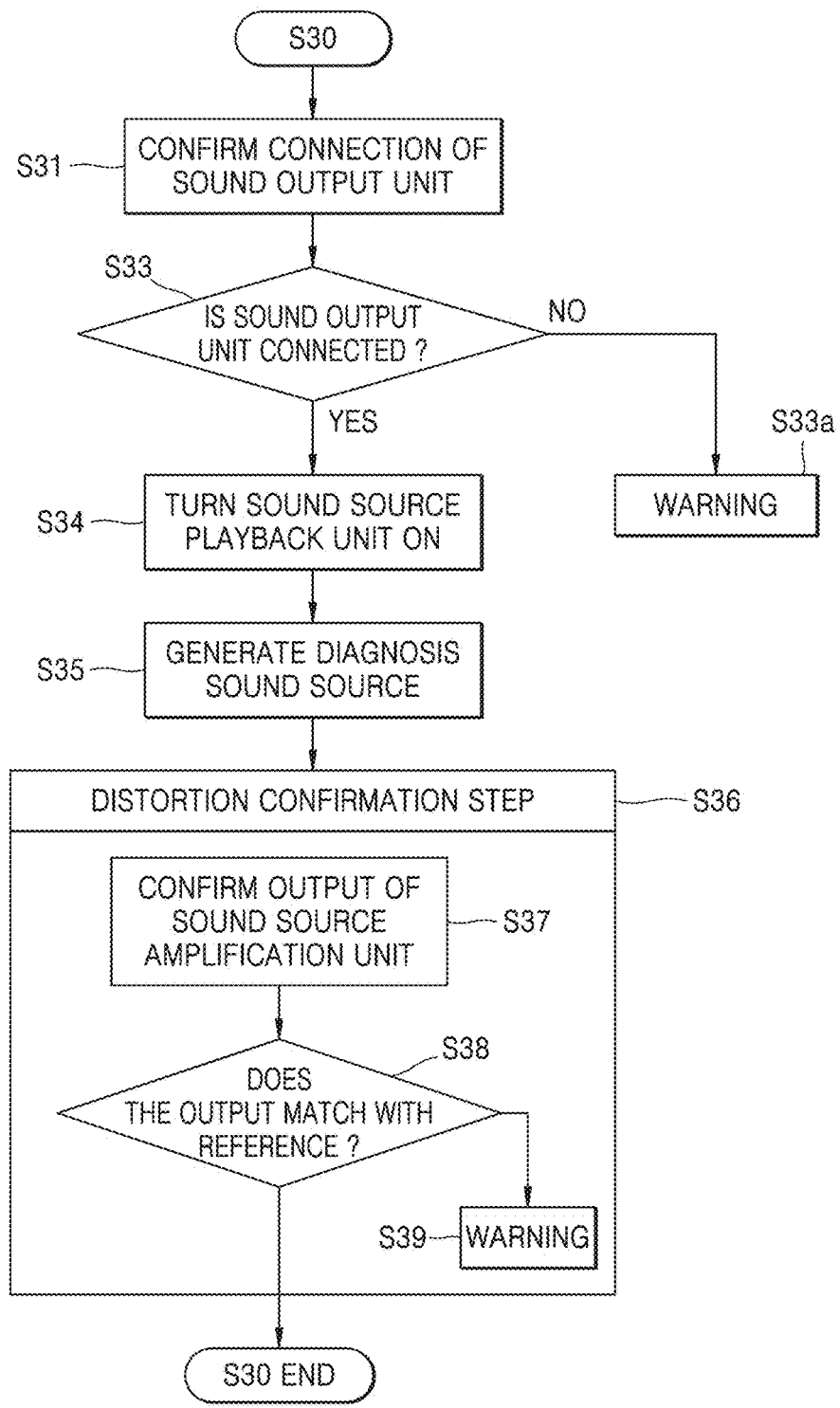
Figure 5:
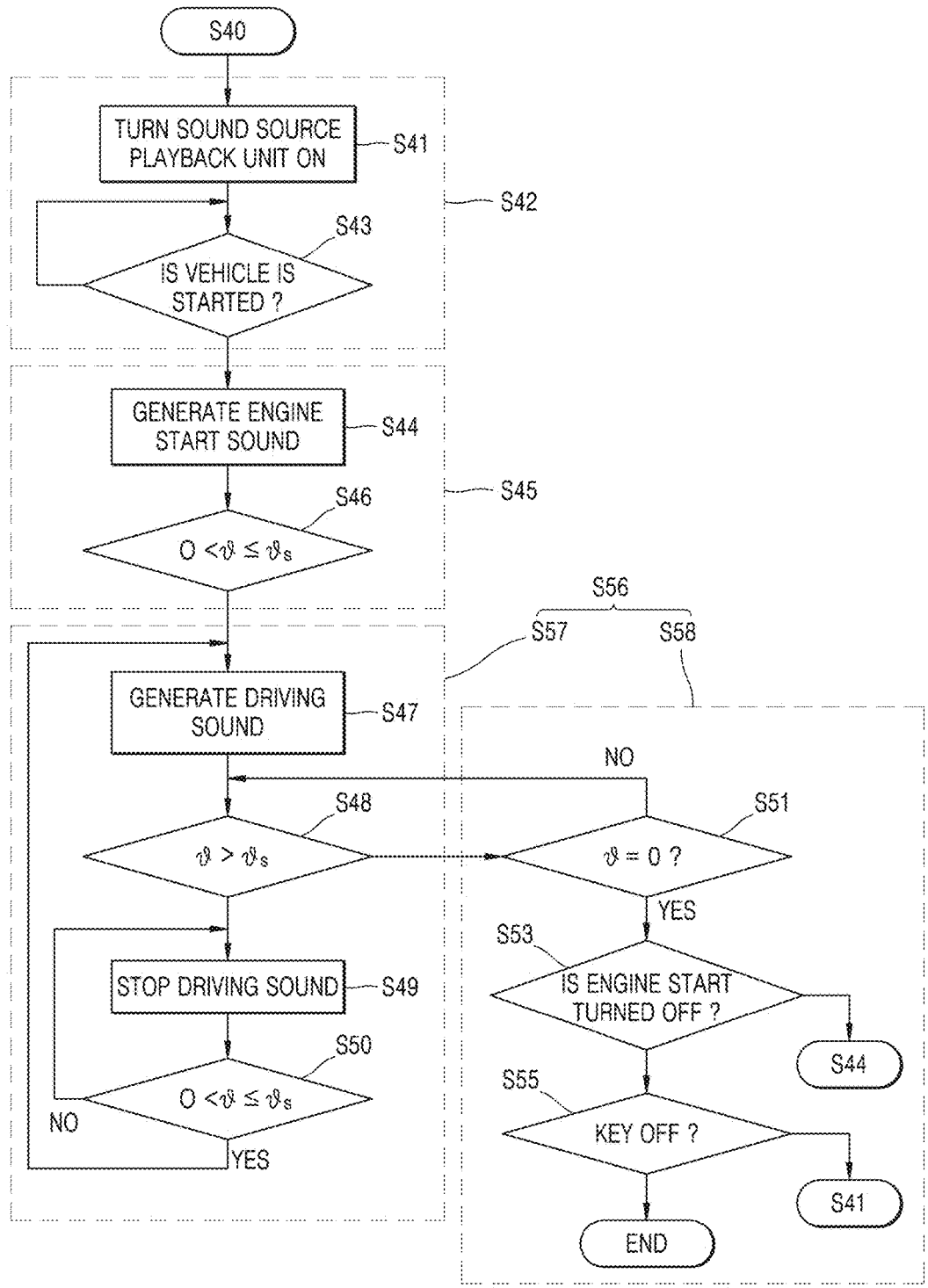
Figure 6:
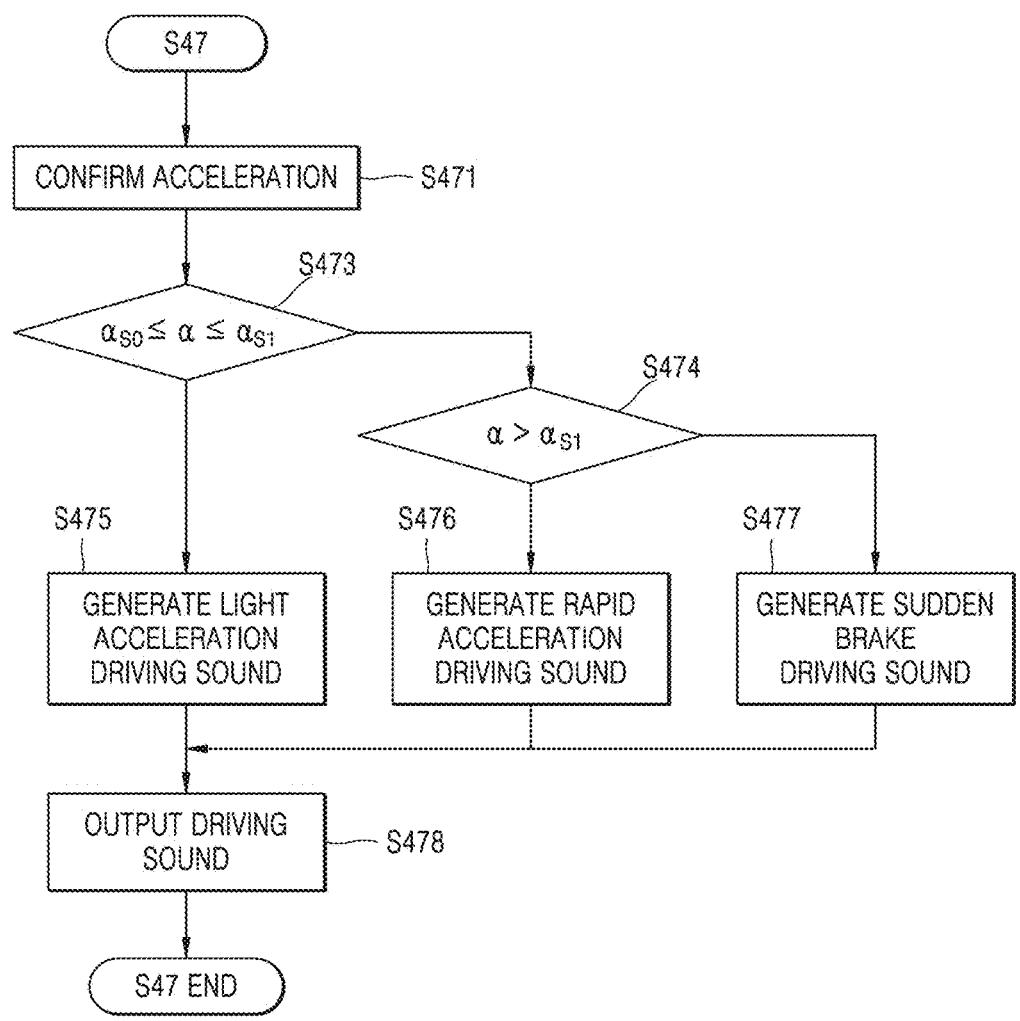

On the other hand, the environmentally-friendly vehicle sound generator apparatus according to an embodiment of the present invention may be further provided with a separate operation switch 200 as shown in FIG. 3, and the operation switch 200 may be configured to be manipulated by a user to perform an on/off operation. According to an on/off signal of the operation switch, the control unit 400 may control the operation of the sound source playback unit 600 to turn on or off the operation state of the sound source playback unit 600.

That is, the operation switch is configured to enable a user to turn on or off the operation thereof by mounting the operation switch inside the vehicle so that the user can turn on or off the operation of the sound source playback unit 600. For example, if a user desires to enjoy driving in a very calm state, the user may manipulate the operation switch to a turned off state in order not to play back and output an operating sound generated according to a vehicle operation state.

Hereinafter, a control process, i.e., an operation process, of the vehicle operating sound generator apparatus according to an embodiment of the present invention will be described with reference to the drawings. First, a providing step S1 of providing an environmentally-friendly vehicle sound generator apparatus according to an embodiment of the present invention is executed, and description of the environmentally-friendly vehicle sound generator apparatus is substituted by the above descriptions to avoid duplicated descriptions.

Thereafter, the control unit applies a control signal for executing an initialization step, and the initialization step S10 includes a diagnosis confirmation step S30 of allowing the control unit 400 to confirm a connection state of the sound output unit 800 and an operation state of the sound source playback unit 600 and compare an output of the sound source amplification unit 700 with a preset reference value to diagnose the presence of distortion. That is, the diagnosis confirmation step S30 confirms and diagnoses a normal operation state of the sound source playback unit, the sound source output unit or the like in the initialization step to prevent the possibility of safety accidents, which may occur if a predetermined sound preset according to a driving state or the like of the vehicle is not output, by confirming generation of an error in the process of storing a sound source in the sound source storage unit and finally playing back and outputting the sound source by the sound output unit through the sound source playback unit. In this embodiment, although the diagnosis confirmation step S30 has been described as an additional step executed in the initialization step of the vehicle, in some cases, it can be diversely modified to execute a process of determining whether or not a vehicle diagnosis device (not shown) is connected to an On Board Diagnostic (OBD) terminal of the vehicle and diagnosing whether or not playback, amplification and output of the sound source are in a normal state through the vehicle diagnosis device. However, in this embodiment, a description will be made centering on the diagnosis confirmation step that is performed in the vehicle itself in the initialization process before the driving of the vehicle More specifically, the diagnosis confirmation step S30 includes a sound output unit connection confirmation determination step (S31, S33), a sound source playback unit operation step S34, a diagnosis sound source generation step S35, and a distortion confirmation step S36.

In the sound output unit connection confirmation determination step (S31, S33), the control unit 400 confirms whether or not the sound output unit 800 establishes a normal electrical connection state. The control unit 400 controls a connection confirmation transmission signal to be transmitted to the sound output unit 800 and checks whether to receive a connection confirmation response signal corresponding to the connection confirmation transmission signal from the sound output unit 800 so that the control unit can confirm whether or not the sound output unit 800 is normally connected.

The sound output unit connection confirmation determination step (S31, S33) includes a sound output unit connection confirmation step S31 and a sound output unit connection determination step S33. The control unit 400 transmits the connection confirmation transmission signal to the sound output unit 800 and confirms the reception of the response signal from the sound output unit 800. In other words, the control unit 400 transmits the connection confirmation transmission signal to the sound source amplification unit 700 to allow the sound source amplification unit 700 to confirm whether or not the sound output unit 800 is normally electrically connected to the sound source amplification unit 700, and confirms whether or not the sound source amplification unit 700 establishes the normal electrical connection state with the sound output unit 800. If it is confirmed that the sound source amplification unit 700 establishes the normal electrical connection state with the sound output unit 800, the sound source amplification unit 700 transmits the connection confirmation response signal to the control unit 400. On the contrary, if it is confirmed that the sound source amplification unit 700 does not establish the normal electrical connection state with the sound output unit 800, the sound source amplification unit 700 does not transmit the connection confirmation response signal to the control unit 400 or transmits a non-connection confirmation response signal to the control unit 400. The transmission of the connection confirmation response signal from the sound source amplification unit 700 to the control unit 400 may be performed in a direct or indirect manner, including being performed through communication protocols such as SPI/I2C or in the form of high/low signals.

Thereafter, in the sound output unit connection determination step S33, the control unit 400 confirms the presence and absence of the connection confirmation response signal applied thereto from the sound output unit 800. If it is determined in the sound output unit connection determination step S33 that the connection confirmation response signal is not present or a non-connection confirmation response signal is present, the control unit 400 executes a connection warning step S33a of outputting a warning signal through an output unit, e.g., a display output unit 420 so that a driver can currently confirm a connection abnormal state of the sound output unit to prevent the occurrence of safety accidents due to a failure in the output of the sound during the driving of the vehicle. In this embodiment, although it has been shown that the display output unit 420 is a separate display, the display output unit 420 can be configured in various manners within the range of implementing a display unit for displaying a connection error state of the sound output unit, such as being formed integrally with a cluster disposed on a rear side of a steering wheel and being replaced with a warning display on a head-up display.

In some cases, the connection warning step S33a may take a configuration of preventing the driving of the vehicle by blocking the start of the engine, but not limited to only the warning through the output unit such as the display output unit 420.

If it is determined in the sound output unit connection determination step S33 that the sound output unit 800 is currently connected to the sound source amplification unit 700, the control unit 400 executes the sound source playback unit operation step S34. In the sound source playback unit operation step S34, the control unit 400 applies an operation control signal to the sound source playback unit 600 to allow the sound source playback unit 600 to form an ON state.

Thereafter, the control unit 400 executes the diagnosis sound source generation step S35 to allow the sound source playback unit 600 to play back a diagnosis sound source stored in the sound source storage unit 500. In the diagnosis sound source generation step S35, the sound source playback unit 600 generates and outputs the diagnosis sound source for application to the sound source amplification unit 700. The diagnosis sound source generated and outputted from the sound source playback unit 600 is in the form of a sine wave, and the control unit 400 determines whether or not the diagnosis sound source exceeds a preset data stored in the storage unit 410 so that the occurrence of an error can be confirmed and determined in the process of playing back or outputting the sound source. In other words, when the control unit 400 is operated to be turned on to output the diagnosis sound source, the control unit 400 executes the distortion confirmation step S36. In the distortion confirmation step S36, the control unit 400 compares a diagnosis sound source amplification signal indicating that the diagnosis sound source generated in the diagnosis sound source generation step is amplified in and outputted from the sound source amplification unit with a preset distortion determination reference value stored in the storage unit 410 to determine whether or not the sound source is distorted and amplified to determine whether or not there occurs a distortion in the diagnosis sound source in the process of generating, amplifying and outputting the diagnosis sound source, and outputs a warning signal if it is determined that the diagnosis sound source amplification signal exceeds the preset distortion determination reference value and thus the diagnosis sound source is distorted.

More specifically, the distortion confirmation step S36 includes a sound source amplification unit output confirmation step 37, an output reference determination step S38, and a distortion warning step S39. First, in the sound source amplification unit output confirmation step S37, the control unit 400 confirms the diagnosis sound source amplification signal outputted from the sound source amplification unit (S37), and then executes the output reference determination step S38 of comparing the diagnosis sound source amplification signal with the preset distortion determination reference value as a preset data stored in the storage unit 410 and determining a result of the comparison. The control unit 400 compares the diagnosis sound source amplification signal with the preset distortion determination reference value, and in this embodiment, the control unit 400 confirms whether or not the diagnosis sound source amplification signal exceeds the preset distortion determination reference value, but is merely an example, and various selective configurations are possible within the range of determining whether or not the diagnosis sound source amplification signal exceeds the reference range through the mutual comparison.

That is, as shown in FIG. 10, the diagnosis sound source play backed by the sound source playback unit 600 is outputted as the diagnosis sound source amplification signal after passing through the sound source amplification unit 700. In this case, the diagnosis sound source amplification signal also has the form of a sine wave similarly to the diagnosis sound source. In other words, the diagnosis sound source amplification signal has the form of sine waves of C1, C2 and C3 over unit time intervals such as ΔT1, ΔT2 and ΔT3, and the control unit 400 compares the diagnosis sound source amplification signal with the preset distortion determination reference value. The preset distortion determination reference value in this embodiment takes a configuration of having voltage values of C7 and C8, and the normal output range is set between C7 and C8. In this case, the diagnosis sound source amplification signal that is present within the range of the preset distortion determination reference value can be converted into a signal having a predetermined output voltage value and outputted, and the diagnosis sound source amplification signal that is beyond the range of the preset distortion determination reference value can be converted into a signal having another value, e.g., a value of 0 and outputted. The diagnosis sound source amplification signal including C1, C2 and C3 shown in the form of a sine wave at an upper portion of a waveform chart of FIG. 10 can be converted into C4, C5 and C6 shown at a lower portion of the waveform chart FIG. 10 and outputted. The control unit 400 determines whether the diagnosis sound source amplification signal maintains a normal output value based on the signal of C4, C5 and C6 or has an output value of 0 so as to confirm whether or not an error occurs.

If a conversion signal of C4 corresponding to the diagnosis sound source amplification signal of C1 is obtained, a normal output state is formed. The control unit 400 can confirm and determine that a distortion is absent in the diagnosis sound source in the process of generating, amplifying and outputting the diagnosis sound source.

On the contrary, a conversion signal of C5 corresponding to the diagnosis sound source amplification signal of C2 forms an abnormal output state that is beyond the normal output range, and the control unit 400 can determine that that a distortion is present in the diagnosis sound source being outputted in the process of generating, amplifying and outputting the diagnosis sound source. In this case, the control unit 400 executes the distortion warning step S39 where the control unit 400 can warn the driver of the occurrence of a distortion in the process of generating and outputting the sound source, and such a warning may take a configuration of being outputted through the display output unit or directly outputted on a cluster.

Meanwhile, the initialization step S10 may further include a separate charging confirmation step S20. In other words, an environmentally-friendly vehicle as an electric vehicle or a plugged-in hybrid vehicle includes a charging cable connector, and the vehicle state sensing unit 100 further includes a charging cable connection sensing unit 170.

In the case where a rechargeable structure through the charging cable is provided, the control unit 400 may execute a charging necessity confirmation, a charging cable connection determination or a charging warning generation confirmation through the separate charging confirmation step S20. The charging confirmation step S20 includes a charging cable connection sensing step S21, a battery level confirmation step S23, a charging sound source playback unit operation step S25, a charging necessity determination step S26, a charging cable connection determination step S27, a charging initiation step S28, and a charging completion step S29 (S29a, S29b).

First, the control unit 400 executes the charging cable connection sensing step S21 where the control unit 400 receives a connection signal from charging cable connection sensing unit 170 by receiving a signal from the charging cable connection sensing unit 170 of the vehicle state sensing unit 100. In this case, the charging cable connection sensing unit 170 can be configured in various forms, such as a separate sensor for sensing whether or not a plug of the charging cable is physically inserted into a charging connector or a power sensor using an electric signal applied from an external charging source (not shown) through the connection of the plug (not shown) of the charging cable.

In addition, the control unit 400 executes the battery level confirmation step S23 of confirming the current energy level in the battery of the vehicle. In this case, the control unit 400 confirms a battery level from a battery sensor of the vehicle state sensing unit 100. Information on the confirmed battery level is transmitted to the control unit 400 through the CAN communication unit. This is an example and the battery level information may be transmitted to the control unit 400 through various communication methods or data transmission methods.

Thereafter, the control unit 400 executes the charging sound source playback unit operation step S25 of applying electric power to the sound source playback unit to switch the sound source playback unit to an ON state. In the charging sound source playback unit operation step S25, the switching of the sound source playback unit to the ON state refers to reception of alarm sound information including charging-related alarm sounds, i.e., a charging initiation alarm sound, a charging completion alarm sound, a charging cable non-connection warning sound, and a charging necessity alarm sound, which are stored in the sound source storage unit 500, from the sound source storage unit 500 through the data switch unit 510, and then formation of an execution preparation standby state.

Then, the control unit 400 executes the charging necessity determination step S26 of determining whether or not the battery needs to be charged. In the charging necessity determination step S26, the control unit 400 compares the confirmed battery level with a preset battery level stored in the storage unit 410 to determine whether or not to charge the battery. If it is determined that the currently sensed and confirmed battery level is equal to or smaller than the preset battery level, the control unit 400 determines that the charging of the vehicle battery is currently necessary and allows the control flow to proceeds to step S27. In the charging cable connection determination step S27, the control unit 400 determines the connection state of the charging cable using the confirmed charging cable connection signal. If it is determined in step S27 that the charging cable is not connected to the vehicle, the control unit 400 allows the control flow to proceed to the charging warning sound generation step S29b where the control unit 400 allows the sound source playback unit to play back a charging warning sound stored in the sound source storage unit to output the charging warning sound through the sound source amplification unit and the sound output unit to warn the driver of the current non-connection state of the cable. Although not shown in this embodiment, the charging confirmation step may further include a step of generating a predetermined time delay after the warning of the non-connection state, forming a standby state, re-sensing a connection state after the lapse of a predetermined time period, and switching the control flow into the flow of the cable connection state, if necessary.

In the meantime, if it is determined in step S27 that the charging cable is connected to the vehicle, the control unit 400 executes the charging initiation step S28. The charging initiation step S28 initiates the charging and outputs a charging initiation sound selected from among sound sources stored in the sound source storage unit 500 through the sound source playback unit 600, the sound source amplification unit 700, and the sound output unit 800. The charging initiation step S28 includes a charging initiation step S28a of initiating the charging of the vehicle battery through a charging connector connected to the charging cable and a charging initiation sound output step S28b of performing a certain output operation to allow the driver to recognize the charging initiation state. In this embodiment, the control unit 400 allows a predetermined charging initiation alarm sound to be outputted through the sound source playback unit, the sound source amplification unit, and the sound output unit using a charging initiation alarm sound stored in the sound source storage unit.

Thereafter, the control unit 400 determines whether or not the charging of the battery is completed by updating a sensing signal at predetermined time intervals and executes the charging completion step (S29, S29a). The charging completion step (S29, S29a) includes a charging completion determination step S29 and a charging completion sound output step S29a. In the charging completion determination step S29, the control unit 400 determines whether or not the charging is completed. In this case, the control unit 400 determines whether or not the current charging level of the battery reaches a preset charging completion reference stored in the storage unit 410 by periodically updating a sensing signal of the battery level, and determines whether or not the charging is completed based on a result of the determination of whether or not the current charging level of the battery reaches the preset charging completion reference. If it is determined in step S29 that the charging is not completed, the control unit repeatedly performs the periodical sensing and confirmation of the battery level while maintaining the charging state. On the contrary, if it is determined in step S290 that the charging of the battery is completed, the control unit 400 applies a signal of interrupting the charging of the vehicle battery through the charging connector to stop the charging operation. In this case, the charging and the interruption of the charging of the battery may be performed through a battery management unit (not shown), and can be modified variously, such as taking a method of allowing the control unit 400 to directly apply a control signal to a charging switch (not shown) that interconnects the charging connector and the battery.

At the same time, the control unit 400 allows the sound source playback unit 600 to play back a charging completion sound using a charging completion alarm sound source stored in the sound source storage unit 500, and amplifies and output the charging completion sound through the sound source amplification unit 700 and the sound output unit 800 to achieve a predetermined charging alarm sound output process (S29a). Similarly to the charging initiation step, the alarm of the charging completion state can be modified in various manners, such as being performed through the output of the sound source or through the display output unit or the cluster.

In addition, although it has been described that the charging confirmation step S20 is provided prior to the diagnosis confirmation step, the charging confirmation step S20 can be configured in various manners within the range of confirming and executing whether or not to perform a predetermined diagnosis or charging process, such as taking a configuration in which the provision order of the charging confirmation step S20 and the diagnosis confirmation step is inverted.

Meanwhile, after the completion of the initialization step S10 of the present invention, the control unit 400 executes an operating sound execution step S40 of determining whether or not to generate an operating sound of the environmentally-friendly vehicle according to the vehicle operation state sensed by the vehicle state sensing unit, amplifying at least one sound source selected from among the sound sources stored in the sound source storage unit 500, and outputting the amplified sound as an operating sound through the sound output unit.

The operating sound execution step S40 includes an operating sound source playback unit operating step S41, an engine start sound operating step S42, a driving sound operating step S45 and a continuation confirmation step S56.

First, at the operating sound source playback unit operating step (S41), the control unit 400 switches the sound source playback unit 600 to the turned-on state, and the switching to the turned-on state refers to receiving a sound source, such as an engine start sound, various driving sounds or the like stored in the sound source storage unit 500, from the sound source storage unit 500 through the data switch unit 510 according to a predetermined control signal and forming an execution preparation standby state in order for the sound source playback unit 600 to output an operating sound.

Then, the control unit 400 executes the engine start sound operating step S42 where the control unit 400 determines whether or not the vehicle engine starts from an engine state sensing signal of the vehicle state sensing unit 100, and controls the engine start sound among the sound sources of an operating sound for informing an operation state of the environmentally-friendly vehicle to be output through the sound output unit. More specifically, the engine start sound operating step S42 includes an engine start determination step S43 and an engine start sound output step S44. In the engine start determination step S43, the control unit 400 determines whether or not the vehicle engine starts from the engine state sensing signal, and a start signal from the start button 110 can be used as the engine state sensing signal, or a crank position sensor of the vehicle state sensing unit 100 can be used in some cases.

If it is determined in step S43 that the vehicle is not in an engine start state, the control unit 400 executes the step S43 to repeatedly sense and determine whether or not the vehicle engine starts by repeatedly updating the engine state sensing signal at predetermined waiting time intervals. Contrarily, if it is determined in step S43 that the vehicle is in an engine start state, the control unit 400 executes step S44 to outputs an engine start sound. That is, the control unit 400 controls the sound source playback unit 600 to play back a sound source corresponding to the engine start sound among the sound sources stored in the sound source storage unit 500, and the played back sound source is output by way of the sound source amplification unit 700 and the sound output unit 800. At this point, the output of the engine start sound is accomplished by the external output unit 810, and in some cases, the engine start sound may be output from the internal output unit 820, and the output sound pressure may be formed to be different in the external output unit and the internal output unit.

Then, if the engine start state is formed by outputting the engine start sound, the control unit 400 executes the driving sound operating step S45. In the driving sound operating step S45, the control unit 400 determines whether or not the vehicle is driving from a vehicle driving speed signal of the vehicle state sensing unit 100, plays back a sound source corresponding to a driving sound among the sound sources of the operating sounds stored in the sound source storage unit 500 through the sound source playback unit 600. The sound source is amplified by the sound source amplification unit 700, and the driving sound is output through the sound output unit 800. The driving sound operating step S45 includes a driving state determination step S46 and a driving sound output step S47, and the driving state determination step S46 may sense a vehicle speed through at least any one of an operating speed of the electric motor, an operating torque of the electric motor and a position of the acceleration pedal, and the control unit 400 compares the sensed vehicle speed with a preset speed for determining whether or not the vehicle is driving, which is one of preset data stored in the storage unit 410.

The present invention may be variously modified, such as taking a configuration in which if it is determined in step S46 that the vehicle speed V is not within the range of the preset speed, i.e., not in a range higher than zero and equal to or lower than the preset speed Vs, in other words, if it is determined that the vehicle is in a stopped state, there is further provided a step of again determining, by the control unit 400, whether or not the vehicle speed is in a stopped state by updating information on the vehicle speed after a predetermined time delay as shown in this embodiment or separately confirming whether or not the engine stops by sensing whether or not the vehicle engine is turned off, and then again determining whether or not the vehicle speed is in a stopped state is determined again by updating information on the vehicle speed.

If the vehicle speed V is within the range of the preset speed, i.e., in a range higher than zero and equal to or lower than the preset speed Vs, the control unit 400 determines that the vehicle is currently in a driving state for outputting a driving sound and executes the driving sound output step (S47) of generating a driving sound from a sound source stored in the sound source storage unit 500 by the sound source playback unit 600 and outputting the driving sound through the sound source amplification unit 700 and the sound output unit 800. The driving sound output step (S47) outputs the driving sound using a sound source of a driving sound corresponding to a predetermined operating sound according to the current driving state of the vehicle so that a pedestrian or a driver can intuitively recognize a driving state through a change of the driving sound with respect to various driving environments.

That is, the driving sound output step S47 includes a vehicle's driving acceleration confirmation step S471, an acceleration driving state determination step (S473 and S474) and a driving sound output execution step (S475, S476, S477 and S478). In the driving acceleration confirmation step S471, the control unit 400 confirms the current driving acceleration state of the vehicle using the vehicle state information of the vehicle state sensing unit 100. Various configurations can be made within a range capable of confirming the driving acceleration of the vehicle, such as confirming the driving acceleration of the vehicle from a vehicle acceleration sensor separately provided in the vehicle state sensing unit, or employing a method of deriving the acceleration of the vehicle using the driving speed of the vehicle.

The acceleration driving state determination step (S473 and S474) determines whether or not the vehicle is in an acceleration driving state by comparing a vehicle driving acceleration signal of the vehicle state sensing unit 100 with a preset acceleration reference value, and the driving sound output execution step (S475, S476, S477 and S478) sets one of a light acceleration driving sound, a rapid acceleration driving sound and a sudden brake driving sound among the operating sounds as a corresponding driving sound according to a result of the determination made at the acceleration driving state determination step, and generates and outputs the corresponding driving sound.

The acceleration driving state determination step (S473 and S474) includes a light acceleration driving determination step S473 and a rapid acceleration driving determination step S474.

First, the control unit 400 executes the light acceleration driving determination step S473 of determining whether or not the current driving state of the vehicle is within a light acceleration driving range using the acceleration information of the vehicle confirmed in the driving acceleration confirmation step S471. In the light acceleration driving determination step S473, the control unit 400 determines whether or not the vehicle driving acceleration signal is within the range of the preset reference value, and if the vehicle driving acceleration signal is within the range of the preset reference value, the current driving state of the vehicle is determined as a light acceleration state including a constant speed driving state. At this point, the preset reference value is a preset value stored in the storage unit 410, and in this embodiment, it includes a first preset acceleration reference value $a_{s0}$ and a second preset acceleration reference value $a_{s1}$. Herein, the first preset acceleration reference value $a_{s0}$ may have a value equal to or smaller than zero according to a design specification, and here, if the first preset acceleration reference value $a_{s0}$ has a value smaller than zero, it is referred to as a light acceleration driving determination step in this embodiment, however, it can be understood to include determination of a light deceleration driving, other than the light acceleration.

The acceleration driving state determination step (S473 and S474) includes the rapid acceleration driving determination step S474, and the rapid acceleration driving determination step S474 is executed when the control unit 400 determines in the light acceleration driving determination step S473 that the vehicle driving acceleration signal does not exist within the range of a preset reference value, and it is determined whether or not the vehicle driving acceleration signal exceeds the range of the preset acceleration reference value, more specifically, exceeds the second preset acceleration reference value $a_{s1}$. If the control unit 400 determines at this step that the current acceleration of the vehicle exceeds the second preset acceleration reference value $a_{s1}$, the control unit 400 determines the current driving state of the vehicle as a rapid acceleration state. Contrarily, if the control unit 400 determines that the current acceleration of the vehicle does not exceed the second preset acceleration reference value $a_{s1}$, the control unit 400 determines the current driving state of the vehicle as a rapid deceleration state as a remaining condition, i.e., determines that the current acceleration of the vehicle is lower than the first preset acceleration reference value $a_{s0}$, and determines the current driving state as sudden braking of an abrupt deceleration state. Although the preset reference value has been set as a range of the first preset acceleration reference value $a_{s0}$ and the second preset acceleration reference value $a_{s1}$ in this embodiment, in some cases, various configurations can be made according to a design specification, such as subdividing the determination step by setting a separate preset reference value for determining the sudden braking.

The current driving state of the vehicle is determined according to a result of the determination made at the acceleration driving state determination step described above, and the driving sound output step S47 includes the driving sound output execution step (S475, S476, S477 and S478) of outputting a driving sound according to the determined and set vehicle driving state. The driving sound output execution step (S475, S476, S477 and S478) includes a light acceleration driving sound generation step S475, a rapid acceleration driving sound generation step S476, a sudden brake driving sound generation step S477 and a driving sound execution step S478. If it is determined in step S473 that the current driving state of the vehicle is a light acceleration state, the control unit 400 generates a driving sound through the sound source generation unit 600 using a sound source corresponding to the light acceleration driving sound from the sound source storage unit 500. In the same manner, if it is determined in step S474 that the current driving state of the vehicle is a rapid acceleration state or a sudden brake state, the control unit 400 generates a driving sound through the sound source generation unit 600 using a sound source corresponding to the rapid acceleration driving sound or the sudden brake driving sound from the sound source storage unit 500 (S476 and S477).

Thereafter, the control unit 400 outputs a driving sound corresponding to each driving state by executing an external or internal output through the sound source amplification unit 700 and the sound output unit 800 using the sound sources regenerated in steps S475, S476 and S477 (S478).

As described above, the driving sound output step (S47) of the present invention configures the steps of determining an actual current driving state of the vehicle, and generating, amplifying and outputting a sound source precisely corresponding to a driving state using various sound sources. FIG. 7 shows a sound spectrum of a driving sound of the vehicle, which is obtained in a real vehicle driving state. As shown in FIG. 7, it can be found that a single sound frequency component is not formed but various sound frequency components are dispersely distributed even with respect to the same driving speed. In other words, it can be found that in the case where the driving speed of the vehicle increases in a low speed driving state, various frequency components are dispersely distributed to form a non-linear shape even with respect to the same driving speed in the case of a real vehicle, unlike a virtual sound output manner (see a dotted line in FIG. 8) of a conventional typical vehicle in which a sound pressure and a frequency linearly increase at a constant ratio with the increase in the speed of the vehicle.

FIG. 8 is an exemplary diagram showing an output of an operating sound which is to be achieved by the environmentally-friendly vehicle operating sound generator apparatus under the control of the control unit. That is, as the speed of the vehicle increases, for example, in the range between 0 km/h and 30 km/h, the driving sound of the vehicle is changed in a frequency change range from A5 to A6 and a sound pressure change range from A7 to A8. In FIG. 8, in the case of solid lines A1 to A4, elements constituting an operating sound as a driving sound to be achieved by the present invention are diagrammatized.

In other words, the present invention does not implement a method in which the sound pressure and the frequency linearly increase at a constant ratio with the increase in the vehicle speed even in the case where the driving speed of the vehicle increases in a low speed driving state, but implements a method in which the sound pressure and the frequency increase in the form of a quadratic function with the increase in the vehicle speed and forms a complex configuration with respect to the same speed range to take a method of performing selection and synthesis to have a sound closer to a driving sound of a real vehicle. As shown in FIG. 8, a change in the frequency of a sound source forms a 0.5- to 2.5-fold change depending on the vehicle speed to induce a sound change of more than 1 octave so that a driver or a pedestrian can audibly recognize the occurrence of an actual change of the sound. For the purpose of such a configuration, the present invention can allow the pitch variation unit 620 of the sound source playback unit 600 to change a pitch of the sound source and can output driving sounds suitable for various driving states in which the times spent for the vehicle to reach a constant speed are different from each other depending on whether or not the vehicle is in a rapid acceleration state even in the low speed driving state of the vehicle, e.g., in a speed range from 0 km/h to 30 km/h through the change in the pitch of the sound source. In order to describe this, FIG. 11 shows a diagram for a vehicle speed and a volume. In FIG. 11, the case is shown where different spent times of D4 and D5 (D4<D5) are formed while the vehicle forms a speed change of from a stop state to D1. In other words, the case (D6) where the time spent for the vehicle to reach the same speed from the stop state is short can be regarded as being in a rapid acceleration state in which acceleration is higher than in the case (D7) where much more time is spent with respect to the same condition. Thus, a sound source outputted in the case of the rapid acceleration such as D6 is a sound source corresponding to a rapid acceleration driving sound. The driver and the pedestrian can audibly recognize that the vehicle is in a rapid acceleration state by quickly increasing a pitch change section such as D8 while forming a sound pressure (or volume) such as D3 with respect to this sound source. On the other hand, the sound pressure (or volume) and the pitch to D3 are changed to correspond to the time D5 increased in the case of the rapid acceleration with respect to a sound source outputted during a light acceleration such as D7 so that a gentle increase of the speed can be recognized audibly by forming a pitch different from that in the case of the rapid acceleration.

Figure 12:
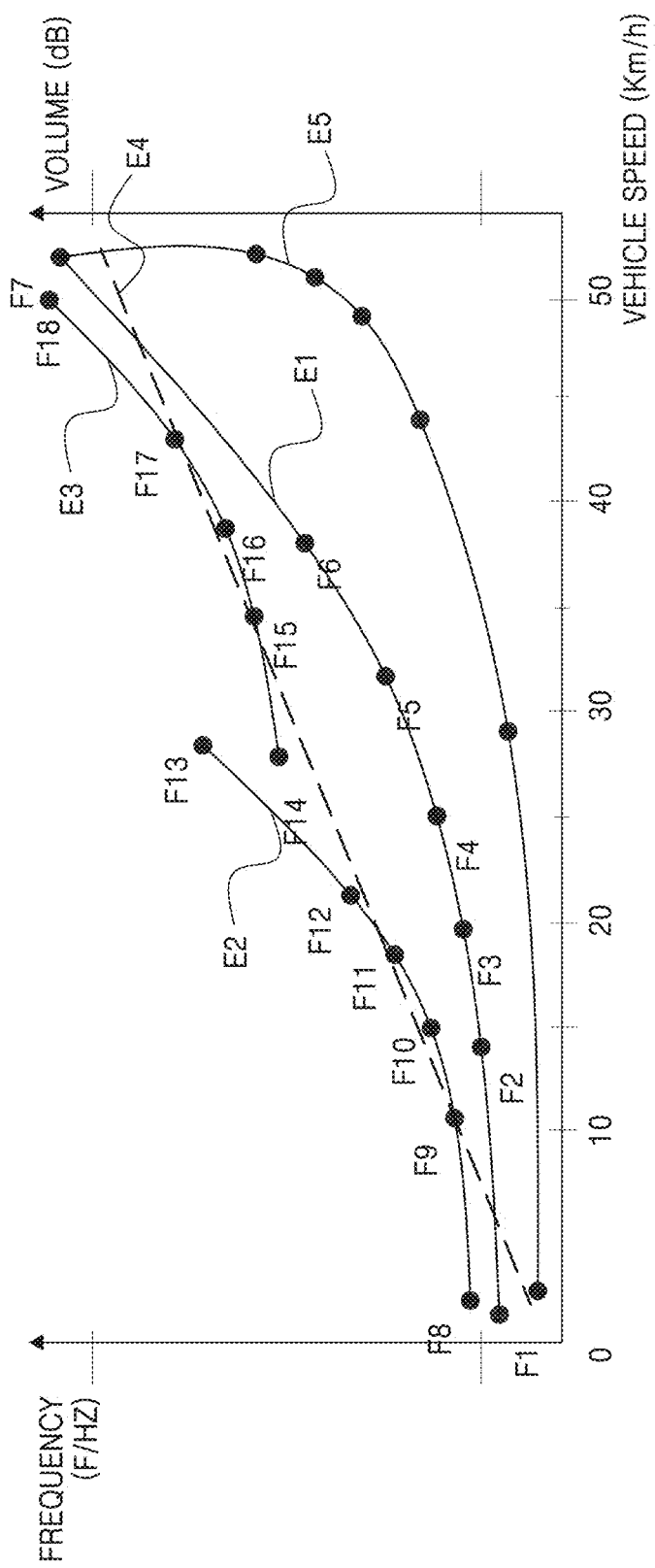
FIG. 12 is a diagram which shows a further detailed formation state for the diagrammatization of the FIG. 8.

In addition, FIG. 12 shows a further detailed formation state for the diagrammatization of the FIG. 8. The change in the frequency and the volume of the sound source according to the vehicle speed takes the form of a lookup table or a map data so as to imitate an output of an engine sound that is substantially the same as a real vehicle engine sound shown in FIG. 12. Unlike a conventional diagram (E4) taking a linear function with respect to the vehicle speed, the present invention has diagrammatic data (E1,E2,E3,E5) taking the form of a quadratic function stored in the storage unit to imitate a real vehicle engine sound. Each diagrammatic data is formed as point data point data (F1 to F18). If more point data is provided, a correct diagram can be outputted, but a storage load of the storage unit may be maximized, thus involving a problem associated with the cost or the output capacity. Contrarily, if less point data is provided, an incorrect output value may be formed due to the occurrence of an error during the interpolation of point data through the arithmetic unit. Therefore, the present invention increases the arrangement density of the point data and enhances a change rate for the frequency or the volume with respect to a region where a drastic change in the frequency or the volume (or sound pressure) according to the vehicle speed occurs so as to form a correct output during the interpolation while preventing an overload of the storage capacity due to an excess of the point data. On the contrary, the present invention decreases the arrangement density of the point data and gently forms a change rate for the frequency or the volume with respect to a region where a slight change in the frequency or the volume according to the vehicle speed occurs, thereby reducing the storage load and simultaneously ensuring reliability of the output value. For example, in the case of a diagram E1 of FIG. 12, the arrangement density of the point data FI and F2 with respect to the vehicle speed is decreased to increase a section interval between FI and F2 in a section between the point data FI and F2 whereas the arrangement density of the point data F2 to F6 with respect to the vehicle speed is increased to decrease the intervals between F2 and F6 in a section between the point data F2 to F6 so that the driver or the pedestrian can recognize, through a sharp change in the pitch and the sound pressure of the real vehicle engine sound, a section where a change rate of the frequency or the sound pressure is large such as a section where the speed change starts or a rapid acceleration section by increasing a drastic change rate of the frequency or the volume (or sound pressure) with the increase of the vehicle speed in a corresponding section.

In addition, a driving sound or the like output in an embodiment of the present invention can be generated by combining and mixing various sound sources together with the change in the pitch. That is, the sound source playback unit 600 of the environmentally-friendly vehicle sound generator apparatus of the present invention includes the sound source mixing unit 610. The sound source mixing unit 610 generates a driving sound close to a real engine sound of a vehicle which drives in various real environments by regenerating a new sound source generated by combining various sound sources stored in the sound source storage unit 500 so that the possibility of generating a safety accident of the driver or the pedestrian can be remarkably lowered by minimizing a sense of difference from a real vehicle engine sound.

FIG. 9 is a diagram illustrating schematic items of a plurality of sound sources for formation of various operating sounds such as an engine start sound and a driving sound according to the driving speed of the vehicle. The plurality of sound sources B1, B2, B3, B4, B5, B6 and B7 is stored in the sound source storage unit 500, and is withdrawn from the sound source storage unit 500 by means of the operation of the sound source playback unit 600 and used. Solid lines shown in FIG. 9 denote sound sources formed to have the correlation between the vehicle speed and the frequency, and dotted lines formed on the solid lines additionally denote the changes in the volume.

The sound source playback unit 600 may take a method of simultaneously mixing and outputting a plurality of sound sources or take a method of sequentially outputting sound sources respectively corresponding to each driving sound according to a driving state, e.g., a driving speed.

When a plurality of sound sources is simultaneously mixed and output, for example, a sound source B1, which is a low frequency sound source unrelated to the change in the speed corresponding to a sound of a low frequency range of 100 Hz to 300 Hz which is a basic major frequency domain of a real internal combustion engine, is output as a basic sound source without a change in the pitch or the volume, and, in addition to this, a sound source provided with a frequency component gently increasing to be higher than an initially generated frequency domain according to the change of speed are mixed and output in a manner of increasing the sound pressure as the vehicle speed increases so that in the case of an actually output sound, since the frequency and the sound pressure are gently increased, a driver or a pedestrian can audibly recognize that a vehicle is driving at a gently increasing speed through the output sound.

Further, in the case of a method of sequentially combining and outputting the sound sources, the sound source mixing unit 610 and/or the pitch variation unit 620 of the sound source playback unit 600 perform/performs the playback operation by dividing a vehicle speed section. That is, in this embodiment, if the divided vehicle speed section is less than a given speed, a sound source of B3 can be used, and if the divided vehicle speed section is more than the given speed, a sound source of B4 can be used. In other words, in the case where the vehicle speed increases to the given speed section from a section where the vehicle is stopped or the vehicle speed is 0 Km/h, the sound source of B3 is outputted after varying the pitch and the volume thereof, in the case where the vehicle speed is more than the given speed section, the output of the driving sound using the sound source of B3 is interrupted and the sound source of B4 capable of more greatly changing the pitch and the volume than in the case of the sound source of B3 with the increase in the vehicle speed can be outputted by adjusting the pitch and the volume thereof. In addition, in order to prevent a feeling of unpleasure caused by intermittence of the sound due to the interruption of the output of the driving sound using the sound source of B3 on a boundary of the given speed, the occurrence of a feeling of unpleasure due to an abrupt change in the sound can be avoided by forming a fade out, i.e., a gradual reduction in the output of a sound source that perishes in an overlapping section of B3 and B4, and a fade in, i.e., a gradual increase in the output of a newly generated sound source. Of course, even in the case of this sequence combination of the sound sources, a method may be taken in which the mixing and outputting operation is performed in a state in which B1 as a basic sound source corresponding to a low frequency sound source of the vehicle is outputted.

Further, besides the driving sound for the light acceleration driving sound of the above-described type, a sound close to a sound of a real vehicle braking or acceleration state can be outputted even in the case of rapid acceleration or sudden braking. In other words, if the control unit 400 determines that the current driving state of the vehicle is the rapid acceleration state and generates a rapid acceleration driving sound (S476), a state can be recognized which increases a frequency change range to strongly accelerate the vehicle with respect to a short speed change width to respond to a change in the speed during a short time period like the form of the sound source B5 that can represent an acceleration section, i.e., a rapid acceleration in a state where the sound source mixing unit 610 and the pitch variation unit 620 of the sound source playback unit 600 output the basic sound source B1 in response to a control signal of the control unit 400. In the case of the sudden braking through the operation of a brake, the adjustment of the pitch is performed such that the frequency abruptly decreases form a high frequency domain to a low frequency domain like a sound source B6, and the volume is reduced together with the decrease in the speed so that a decelerated state of the vehicle can be recognized. More specifically, in the case where the sudden braking is performed by the operation of the brake of the vehicle, the pitch of the output sound source is changed such that a pitch of the frequency of the sound source B5 outputted prior to the sound source B6 is varied, i.e., is decreased by more than 30% while greatly reducing the volume in order to represent and provide an audible feeling when the vehicle is braked suddenly so that the decelerated state of the vehicle can be recognized audibly. In this case, the frequency of the changed sound source B6 is varied by more than 30% to adjust the pitch thereof to respond to the frequency of the sound source B5 prior to the change in the pitch. In the case where an audible frequency band audibly recognized by the driver or the pedestrian is represented as a ⅓ octave band, the central frequencies of the ⅓ octave band to which the sound sources before and after the change belong are continuous to each other, and sound regions are formed to overlap with each other centering on the central frequencies of the ⅓ octave band between the sound sources before and after the change so that the driver or the pedestrian can recognize it through the output of continuous sounds between the changed sound sources being outputted. Thus, the driver or the pedestrian does not feel a sense of difference so that heterogeneous sound sources whose pitches are varied can be outputted promptly to prevent audible formation of a feeling of unpleasure.

Thereafter, in the case where the rapid acceleration is re-performed like a sound source B7, a rapid acceleration state after the sudden braking can be represented through the change in the pitch that increases the frequency for the basic sound source in the pitch variation unit and the adjustment of the volume in the sound source mixing unit. By virtue of the change in the pitch and the mixing of the sound sources, other than the linear relationship between a batch linear vehicle speed and a sound volume, a sound similar and close to a sound generated from a real internal combustion engine can be outputted to minimize a sense of difference from an engine start sound or a driving sound of the vehicle that is typically recognized by the pedestrian or the driver so that the presence or the driving state of the vehicle can be recognized, thereby minimizing the possibility of occurrence of safety accidents due to the vehicle.

On the other hand, the continuation confirmation step S56 of the present invention is executed after an engine start sound or a driving sound of the vehicle is output, and whether or not to output a corresponding operating sound can be determined or controlled through confirmation of the current state. That is, the continuation confirmation step S56 is executed after the driving sound operating step S45, in which the control unit 400 determines an operation state of the vehicle after calculating the vehicle driving speed and updating the engine state sensing signal of the vehicle state sensing unit 100, and the sound output unit 800 determines and executes whether or not to continue the output of an operating sound such as an engine start sound or a driving sound. The continuation confirmation step S56 includes a high speed stop confirmation step S57 and an output state confirmation step S58. The high speed stop confirmation step S57 confirms the current operation state of the vehicle by updating the vehicle driving speed signal and the engine state sensing signal of the vehicle state sensing unit 100, i.e., an engine start signal for determining whether or not the engine start continues, and determines and executes whether or not to stop the driving sound by determining whether or not the vehicle drives at a high speed. That is, if it is determined in the high speed stop confirmation step S57 that the vehicle is in a driving state and a driving sound is output, it is determined that a virtual driving sound is not needed when the vehicle enters the high speed driving state, and output of the virtual driving sound is stopped. The high speed stop confirmation step S57 includes a high speed driving determination step S48 and a driving sound stopping step S49 and may further include a light acceleration driving state determination step S50 in some cases. That is, the control unit 400 determines whether or not the current vehicle speed exceeds the preset speed Vs by confirming or updating the current vehicle speed and comparing the current vehicle speed with the preset speed Vs. If it is determined in step S48 that the current vehicle speed exceeds the preset speed Vs, the control unit 400 determines that the vehicle currently enters the high speed driving state and output of the driving sound is not needed, and executes the driving sound stopping step S49 of excluding output of the driving sound. Although such a preset speed Vs may have the same value as that in the case described above, if noise of the road surface according to the driving of the vehicle exceeds the engine sound of the vehicle, it can be adjusted variously according to the design specification. The vehicle speed is continuously updated by executing the light acceleration driving state determination step S50 after the driving sound stopping step S49, and then it is confirmed whether or not the vehicle speed reaches a range less than the preset speed Vs. If the vehicle speed reaches a corresponding range, it is determined that output of the driving sound is needed, and the control flow proceeds to the driving sound output step S47 to output a driving sound when the vehicle speed enters again the corresponding speed range.

Contrarily, if it is determined in the light acceleration driving state determination step S50 that the current vehicle speed does not enter the range less than the preset speed Vs, the control unit 400 determines that the vehicle maintains the high speed driving state and output of the driving sound is not needed and repeats the light acceleration driving state determination step S50 by switching the control flow before or after step S49.

Meanwhile, the continuation confirmation step S56 includes the output state confirmation step S58 in addition to the high speed stop confirmation step S57, and the output state confirmation step S58 confirms the current operation state of the vehicle by updating the vehicle driving speed signal and the engine state sensing signal, i.e., the engine start signal of the vehicle state sensing unit 100, and confirms, determines and executes whether or not to continue the engine start sound or the driving sound by determining whether or not the vehicle engine is turned off. The output state confirmation step S58 includes a vehicle stop confirmation step S51 and a vehicle start confirmation step S53. The control unit 400 confirms in the vehicle stop confirmation step S51 whether or not the vehicle drives or stops currently by confirming the speed of the vehicle. That is, if it is determined in the high speed driving determination step S48 of the high speed stop confirmation step S57 that the driving speed of the vehicle is not in a high speed driving state, the control unit 400 executes the vehicle stop confirmation step S51, and if it is not determined at the vehicle stop confirmation step S51 that the vehicle is stopped, the control unit 400 allows the control flow to return to step S48 to continue the driving sound and repeatedly executes the high speed driving determination step. Contrarily, if it is determined that the vehicle is stopped, the control unit 400 confirms whether or not an end signal is generated by the stop of the engine or the start button of the vehicle by executing the vehicle start confirmation step S53. If it is determined that start of the engine of the vehicle is continued, the control unit 400 allows the flow control to proceed to step S44 to continue output of the engine start sound and confirm whether or not to switch to a driving state of the vehicle.

Contrarily, if it is determined in step S53 that the vehicle stops or the engine is turned off through the start button of the vehicle, the overall control of the environmentally-friendly vehicle operating sound generator apparatus can be terminated, or, in some cases, if a vehicle key withdrawal confirmation step S55 is further provided, there may be further provided a process of confirming whether or not the environmentally-friendly vehicle operating sound apparatus stops when a vehicle key withdrawal signal is generated, i.e., a conventional vehicle key is separated from the keyhole, or a driver possessing a smart key moves away from the vehicle by more than a predetermined distance, and thus the overall state of the vehicle is switched to a stopped state or a surveillance mode for preventing theft of the vehicle.

INDUSTRIAL APPLICABILITY

While the present invention has been described centering on the output of a virtual sound of an environmentally-friendly vehicle such as a hybrid vehicle, an electric vehicle or the like, it can also be applied to a two-wheeled vehicle or a three-wheeled vehicle and can be applied to a variety of applications within the range of achieving the output of the virtual sound.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention.

Therefore, the embodiments disclosed herein are provided in order to describe the technical spirit of the present invention, but the scope of the present invention is not limited by the embodiments. The true technical scope of the present invention should be defined by the technical sprit of the appended claims, and all the technical spirits within the scope equivalent thereto should be construed as falling within the scope of the present invention.

The invention claimed is:

1. A method for controlling an environmentally-friendly vehicle operating sound generator apparatus, the method comprising:
    a providing step of providing the environmentally-friendly vehicle operating sound generator apparatus comprising a vehicle state sensing unit for sensing an operation state of a vehicle, a sound source storage unit for storing a plurality of operating sounds that can be output according to the operation state of the vehicle in a form of a sound source data, a sound source playback unit for selecting at least one of the operating sounds stored in the sound source storage unit and playing back the at least one of the operating sounds selected by the source playback unit and outputted from the sound source storage unit, a sound source amplification unit for amplifying the at least one of the operating sounds played back by the sound source playback unit, a sound output unit for outputting the at least one of the operating sounds amplified by the sound source amplification unit, and a control unit for receiving a sensing signal from the vehicle state sensing unit and controlling operation of the sound source playback unit so as to play back the at least one of the operating sounds in different playback methods in such a manner as to control and change the at least one of the operating sounds according to the received sensing signal;
    an initialization step of comprising a diagnosis confirmation step (S30) of allowing the control unit to confirm a connection state of the sound output unit and an operation state of the sound source playback unit and compare an output of the sound source amplification unit with a preset reference value to diagnose presence of distortion; and
    an operating sound execution step of allowing the control unit to determine whether or not to generate an operating sound of the environmentally-friendly vehicle according to the vehicle operation state sensed by the vehicle state sensing unit, output at least one sound source, selected from among the sound sources stored in the sound source storage unit, as the at least one of the operating sounds through the sound output unit.

2. The method according to claim 1, wherein the operating sound execution step comprises:
    a sound source playback unit operation step of operating the sound source playback unit to be turned on;
    an engine start sound operating step of determining whether or not to start the vehicle from an engine state sensing signal of the vehicle state sensing unit, and outputting an engine start sound of the operating sounds through the sound output unit;
    a driving sound operating step of determining whether or not the vehicle drives from a vehicle driving speed signal of the vehicle state sensing unit, and outputting a driving sound of the operating sounds through the sound output unit; and
    a continuation confirmation step of confirming a current operation state of the vehicle by updating the vehicle driving speed signal and the engine state sensing signal of the vehicle state sensing unit, and determining whether or not to continue the output of the engine start sound or the driving sound.

3. The method according to claim 2, wherein the engine start sound operating step comprises:
    an engine start determination step of determining whether or not to start the engine of the vehicle from the engine state sensing signal; and
    an engine start sound output step of, if it is determined in the engine start determination step that the engine of the vehicle is in a started state, outputting the engine start sound of the operating sounds through the sound output unit.

4. The method according to claim 2, wherein the driving sound operating step comprises:
    a driving state determination step of determining whether or not the vehicle drives from the vehicle driving speed signal of the vehicle state sensing unit;
    a driving sound output step of, if it is determined in the driving state determination step that a current driving speed of the vehicle is equal to or smaller than a preset speed, outputting the driving sound of the operating sounds through the sound output unit.

5. The method according to claim 4, wherein the driving sound output step comprises:
    an acceleration driving state determination step of determining whether or not the vehicle is in an acceleration driving state by comparing a vehicle driving acceleration signal of the vehicle state sensing unit with a preset acceleration reference value; and
    a driving sound output execution step of generating and outputting, as a corresponding driving sound, one of a light acceleration driving sound, a rapid acceleration driving sound, and a sudden brake driving sound of the operating sounds based on a result of the determination made in the acceleration driving state determination step.

6. The method according to claim 5, wherein the acceleration driving state determination step comprises:
    a light acceleration driving determination step of, if it is determined that the vehicle driving acceleration signal is within the range between 0 and the preset acceleration reference value, determining that the driving state of the vehicle is a light acceleration state; and
    a rapid acceleration driving determination step of, if it is determined that the vehicle driving acceleration signal is not within the range between 0 and the preset acceleration reference value, determining whether or not the vehicle driving acceleration signal is larger than the preset acceleration reference value.

7. The method according to claim 6 wherein if it is determined in the rapid acceleration driving determination step that the vehicle driving acceleration signal is not larger than the preset acceleration reference value, the driving sound output execution step sets the corresponding driving sound as a sudden brake driving sound.

8. The method according to claim 2, wherein the continuation confirmation step comprises:
    a high speed stop confirmation step of confirming the current operation state of the vehicle by updating the vehicle driving speed signal and the engine state sensing signal of the vehicle state sensing unit, and determining and executing whether or not to stop the driving sound by determining whether or not the vehicle drives at a high speed; and an output state confirmation step of confirming the current operation state of the vehicle by updating the vehicle driving speed signal and the engine state sensing signal, and determining whether or not to continue the engine start sound or the driving sound by determining whether or not the vehicle engine is turned off.

9. The method according to claim 1, wherein the diagnosis confirmation step comprises:
   a sound output unit connection confirmation determination step of confirming whether or not the sound output unit 800 establishes a normal electrical connection state;
   a sound source playback unit operation step of, if it is determined that the sound output unit establishes the normal electrical connection state, applying electric power to the sound source playback unit to allow the sound source playback unit to be operated to be turned on;
   a diagnosis sound source generation step of allowing the sound source playback unit to play back a diagnosis sound source stored in the sound source storage unit;
   a distortion confirmation step of comparing a diagnosis sound source amplification signal indicating that the diagnosis sound source generated in the diagnosis sound source generation step is amplified in and outputted from the sound source amplification unit with a preset distortion determination reference value for confirming whether or not the sound source is distorted and amplified to determine whether or not the diagnosis sound source amplification signal is distorted, and outputting a warning signal if it is determined that the diagnosis sound source amplification signal exceeds the preset distortion determination reference value and thus the diagnosis sound source is distorted.

10. The method according to claim 9, wherein the sound output unit connection confirmation determination step comprises:
   a sound output unit connection confirmation step of allowing the control unit to transmit a connection confirmation transmission signal to the sound source amplification unit to allow the sound source amplification unit to confirm whether or not the sound output unit is normally electrically connected to the sound source amplification unit, and receive a connection confirmation response signal indicating whether or not the sound source amplification unit establishes a normal electrical connection state with the sound output unit from the sound source amplification unit; and
   a sound output unit connection determination step of determining whether the connection confirmation response signal is not present or a non-connection confirmation response signal is present in the sound output unit connection confirmation step.

11. The method according to claim 10, wherein the sound output unit connection determination step further comprises a connection warning step of outputting a warning signal so that a driver can confirm a connection abnormal state of the sound output unit if it is determined in the sound output unit connection determination step that the sound source amplification unit is not electrically connected to the sound output unit.

12. The method according to claim 11, wherein the connection warning step comprises at least one of a sound warning through the sound output unit, a video warning through a display output unit, and an engine blocking warning of blocking the start of the engine of the vehicle.

13. The torque sensor device according to claim 9, wherein the distortion confirmation step comprises:
   a sound source amplification unit output confirmation step of confirming the diagnosis sound source amplification signal outputted from the sound source amplification unit;
   an output reference determination step of comparing the diagnosis sound source amplification signal with the preset distortion determination reference value as a preset data stored in the storage unit and determining a result of the comparison; and
   a distortion warning step of, if it is determine in the output reference determination step that the diagnosis sound source amplification signal is beyond the preset distortion determination reference value, allowing the control unit to determine that a distortion occurs in the diagnosis sound source being outputted in the process of generating, amplifying and outputting the diagnosis sound source and warn a driver of the distortion.

14. The method according to claim 13, wherein the diagnosis sound source amplification signal is compared with the preset distortion determination reference value in the output reference determination step, and in the diagnosis sound source amplification signal, a signal that is present within a range of the preset distortion determination reference value is converted into a signal having a predetermined output voltage value and outputted, and a signal that is beyond the range of the preset distortion determination reference value is converted into a signal having a value of 0 and outputted.

15. The method according to claim 2, wherein the initialization step further comprises a charging confirmation step of confirming necessity for the charging of the vehicle, and the vehicle state sensing unit further comprises a charging cable connection sensing unit, and
   wherein the charging confirmation step comprises:
   a charging cable connection sensing step of allowing the charging cable connection sensing unit to sense whether or not a charging cable is connected to a charging unit of the vehicle;
   a battery level confirmation step of confirming a battery level from a battery sensor of the vehicle state sensing unit;
   a charging sound source playback unit operation step of apply electric power to the sound source playback unit to operate the sound source playback unit to be turned on;
   a charging necessity determination step of, if the battery level confirmed in the battery level confirmation step is equal to or smaller than a preset battery level as a reference value for determination of whether or not to charge the battery, determining that the charging of the vehicle is currently needed;
   a charging cable connection determination step of determining whether or not the charging cable is connected to the vehicle based on a result of the confirmation of whether or not the charging cable is connected to the charging unit in the charging cable connection sensing step;
   a charging initiation step of, if it is determined in charging cable connection determination step that the charging cable is connected to the vehicle, initiating the charging and outputting a charging initiation sound selected from among sound sources stored in the sound source storage unit through the sound source playback unit, the sound source amplification unit, and the sound output unit; and a charging completion step of determining whether or not the charging of the battery is completed by updating a sensing signal of the battery sensor, and outputting a charging completion sound selected from among sound sources stored in the sound source storage unit through the sound source playback unit, the sound source amplification unit, and the sound output unit.

16. An environmentally-friendly vehicle sound generator apparatus, comprising:

a vehicle state sensing unit for sensing an operation state of a vehicle;

a sound source storage unit for storing a plurality of operating sounds that can be output according to the operation state of the vehicle in a form of a sound source data;

a sound source playback unit for selecting at least one of the operating sounds stored in the sound source storage unit and playing back the at least one of the operating sounds selected by the source playback unit and outputted from the sound source storage unit;

a sound source amplification unit for amplifying the at least one of the operating sounds played back by the sound source playback unit;

a sound output unit for outputting the at least one of the operating sounds amplified by the sound source amplification unit; and a control unit for receiving a sensing signal from the vehicle state sensing unit and controlling operation of the sound source playback unit so as to play back the at least one of the operating sounds in different playback methods in such a manner as to control and change the at least one of the operating sounds according to the received sensing signal, wherein the control unit confirms a connection state of the sound output unit and an operation state of the sound source playback unit, and diagnoses presence of a distortion by comparing an output of the sound source amplification unit with a preset reference value.

17. The environmentally-friendly vehicle sound generator apparatus according to claim 16, wherein the vehicle state sensing unit senses at least one of a power energy charged state, an operation ready state, a gear operation state, an operating speed of an electric motor, an operating torque of an electric motor, an acceleration pedal position, a brake pedal position, a charging cable connection state, and an engine rotation speed of the vehicle.

18. The environmentally-friendly vehicle sound generator apparatus according to claim 17, wherein the sound source storage unit has stored therein, in the form of a sound source data, an engine start sound of the vehicle, a driving sound of the vehicle engine during driving of the vehicle, an acoustic sound including a diagnosis warning sound generated to warn abnormality during outputting of a distortion of a sound output of the vehicle and a separate warning sound, and a voice sound formed in a form of a voice guidance message.

19. The environmentally-friendly vehicle sound generator apparatus according to claim 16, wherein the vehicle state sensing unit further comprises a charging cable connection sensing unit for sensing connection of a charging cable to the vehicle to confirm whether or not a charger of the vehicle is connected to a power supply, and the sound source playback unit is controlled in operation by the control unit to playback a charger connection sound of charging sounds stored in the sound source storage unit depending on whether or not the charger is connected to the power supply.

* * * * *